US006963463B2

(12) United States Patent
Sri-Jayantha et al.

(10) Patent No.: US 6,963,463 B2
(45) Date of Patent: Nov. 8, 2005

(54) ROTATIONAL VIBRATION VELOCITY-BASED SENSOR FOR DISK DRIVES

(75) Inventors: Sri M. Sri-Jayantha, Ossining, NY (US); Hien Dang, Nanuet, NY (US); Vijayeshwar Das Khanna, Millwood, NY (US); Gerard McVicker, Stormville, NY (US); Mitsuro Ohta, Yokohama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 415 days.

(21) Appl. No.: 10/153,687

(22) Filed: May 24, 2002

(65) Prior Publication Data

US 2003/0218819 A1 Nov. 27, 2003

(51) Int. Cl.[7] ............................................. G11B 21/02
(52) U.S. Cl. ..................................... 360/75; 360/77.03
(58) Field of Search ..................... 360/60, 75, 77.02, 360/77.03, 78.04, 78.11, 77.05, 77.08, 256.4; 324/210–212

(56) References Cited

U.S. PATENT DOCUMENTS

| | | | |
|---|---|---|---|
| 5,400,196 A | | 3/1995 | Moser et al. |
| 5,402,400 A | * | 3/1995 | Hamada et al. ........... 360/78.06 |
| 5,426,545 A | | 6/1995 | Sidman et al. |
| 5,608,586 A | | 3/1997 | Sri-Jayantha et al. |
| 5,663,847 A | * | 9/1997 | Abramovitch ........... 360/77.02 |
| 5,721,457 A | | 2/1998 | Sri-Jayantha et al. |
| 6,088,185 A | | 7/2000 | Ratliff et al. |
| 6,109,555 A | * | 8/2000 | Svenson et al. ............. 242/287 |
| 6,122,139 A | * | 9/2000 | Sri-Jayantha et al. ..... 360/97.02 |
| 6,567,232 B1 | * | 5/2003 | Klaassen ....................... 360/75 |
| 6,580,579 B1 | * | 6/2003 | Hsin et al. ................ 360/77.02 |
| 6,597,532 B1 | * | 7/2003 | Usui et al. ................ 360/97.03 |
| 6,754,019 B2 | * | 6/2004 | Tokizono et al. .............. 360/53 |

FOREIGN PATENT DOCUMENTS

JP 2565637 10/1996

OTHER PUBLICATIONS

Charlie Hernden, "Vibration Cancellation Using Rotational Accelerometer FeedForward in HDDS", Data Storage, Nov. 2000, 4 Pages Total.
Jinzenji et al., "Acceleration FeedForward Control Against Rotational Disturbance in Hard Disk Drives" APMRC, Nov. 6–8, 2000, TA6-01-TA6-02, 2 Pages Total.
Jinzenji et al., "Acceleration FeedForward Control Against Rotational Disturbance in Hard Disk Drives", IEEE 2001, Nov. 22, 2000, 6 Pages Total.

* cited by examiner

*Primary Examiner*—David Hudspeth
*Assistant Examiner*—Jason Olson
(74) *Attorney, Agent, or Firm*—Thomas R. Berthold

(57) ABSTRACT

A disk drive (HDD) subject to linear and rotational vibration, includes an independent sensing unit for sensing a rotational velocity component of the HDD rotational vibration in a predetermined frequency range.

16 Claims, 25 Drawing Sheets

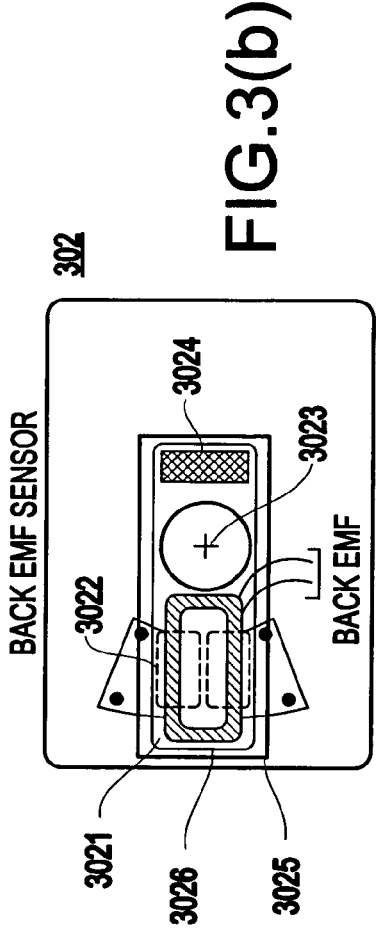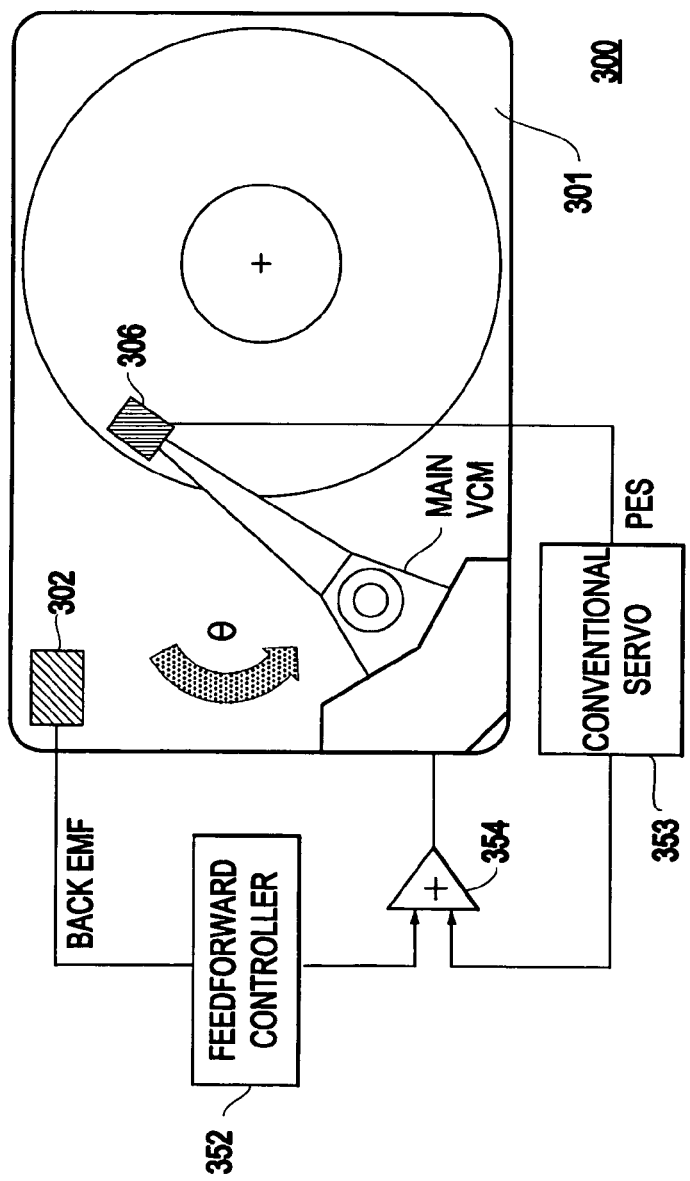

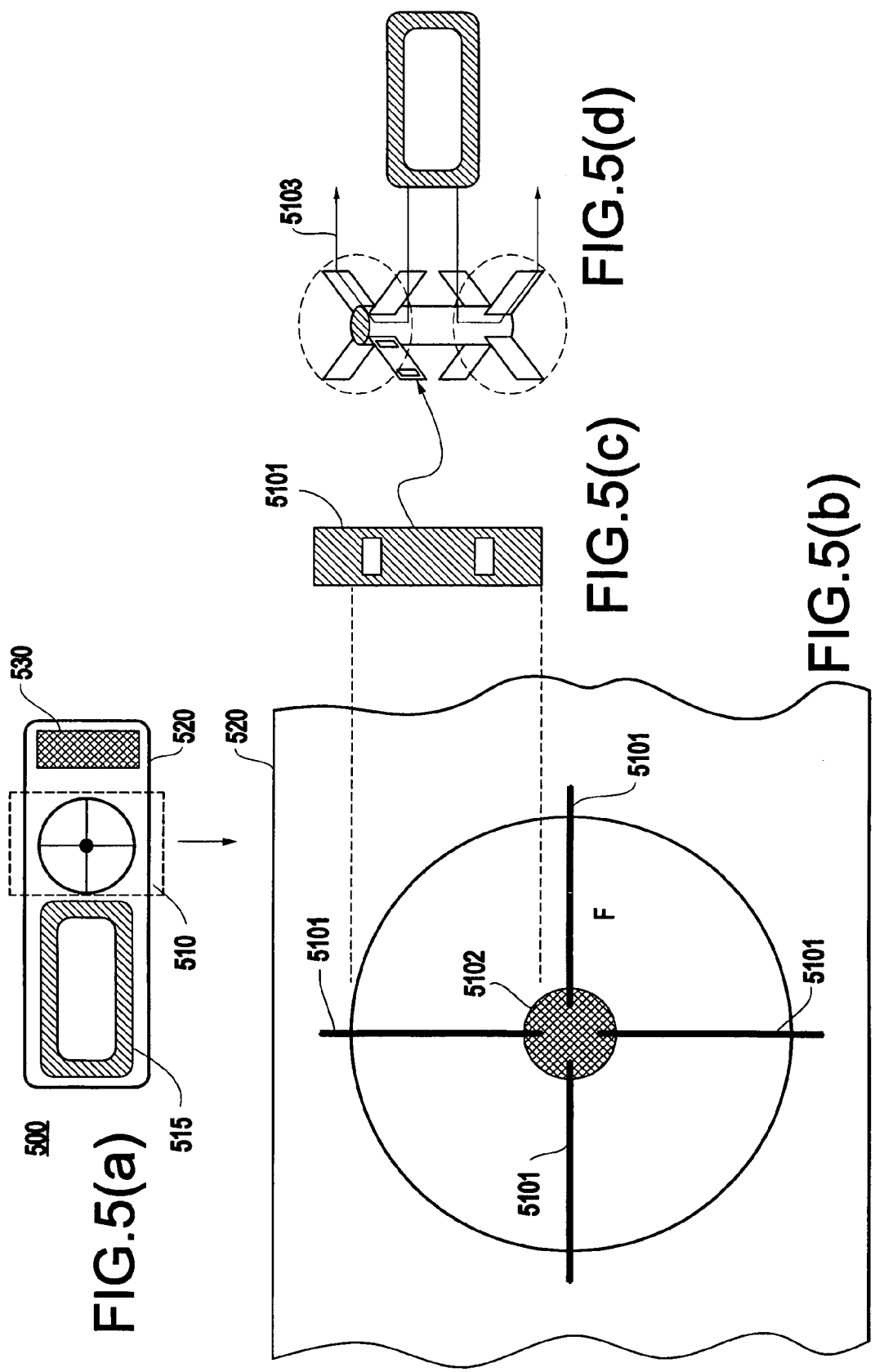

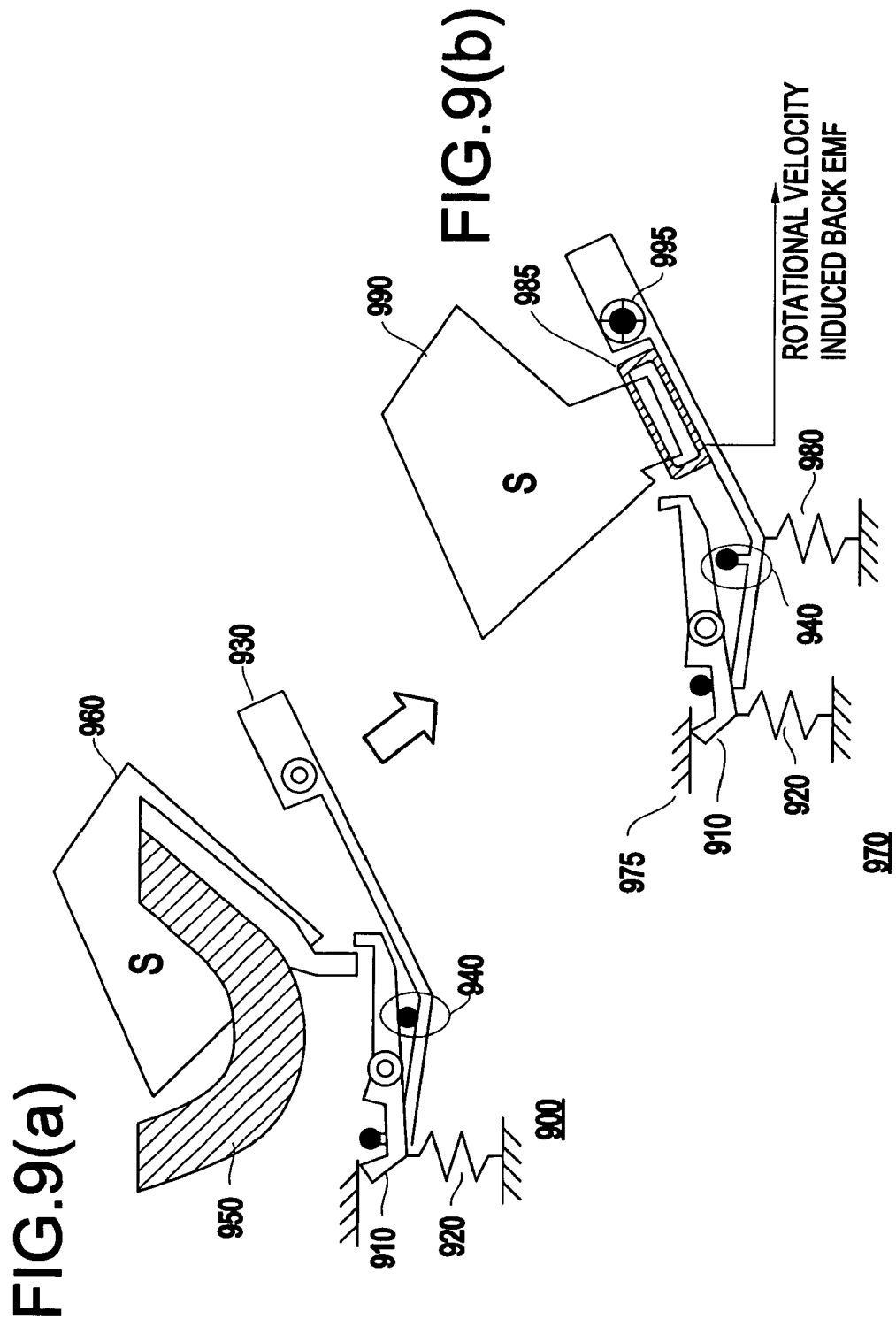

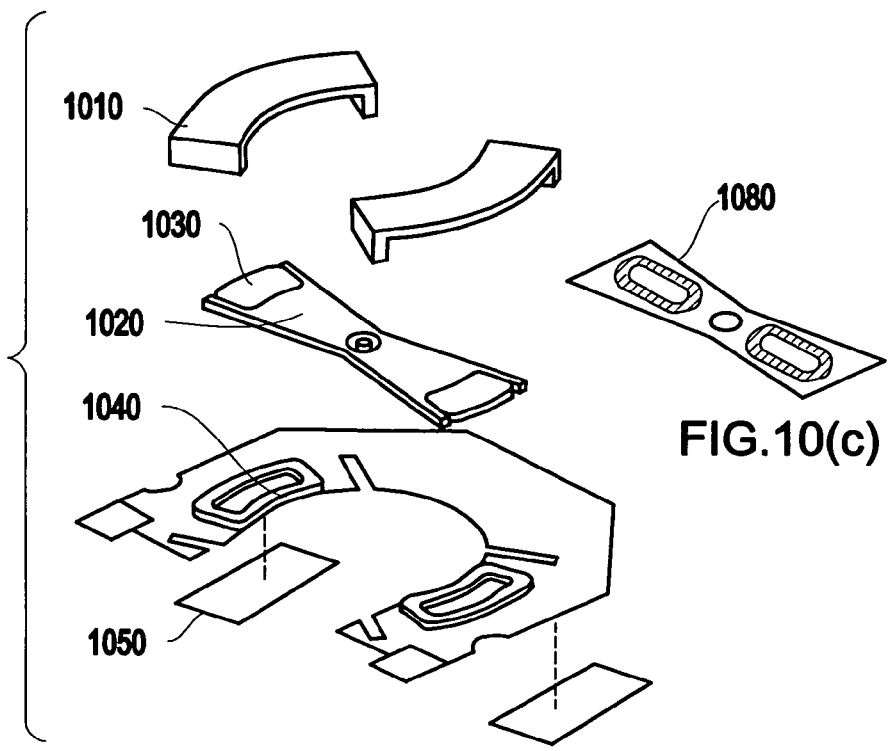
FIG.10(a)
FIG.10(c)
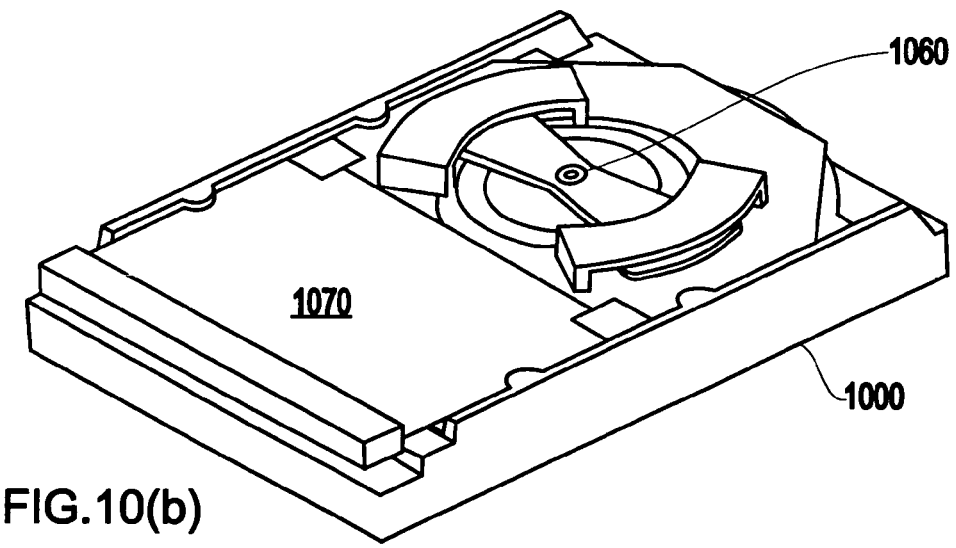
FIG.10(b)

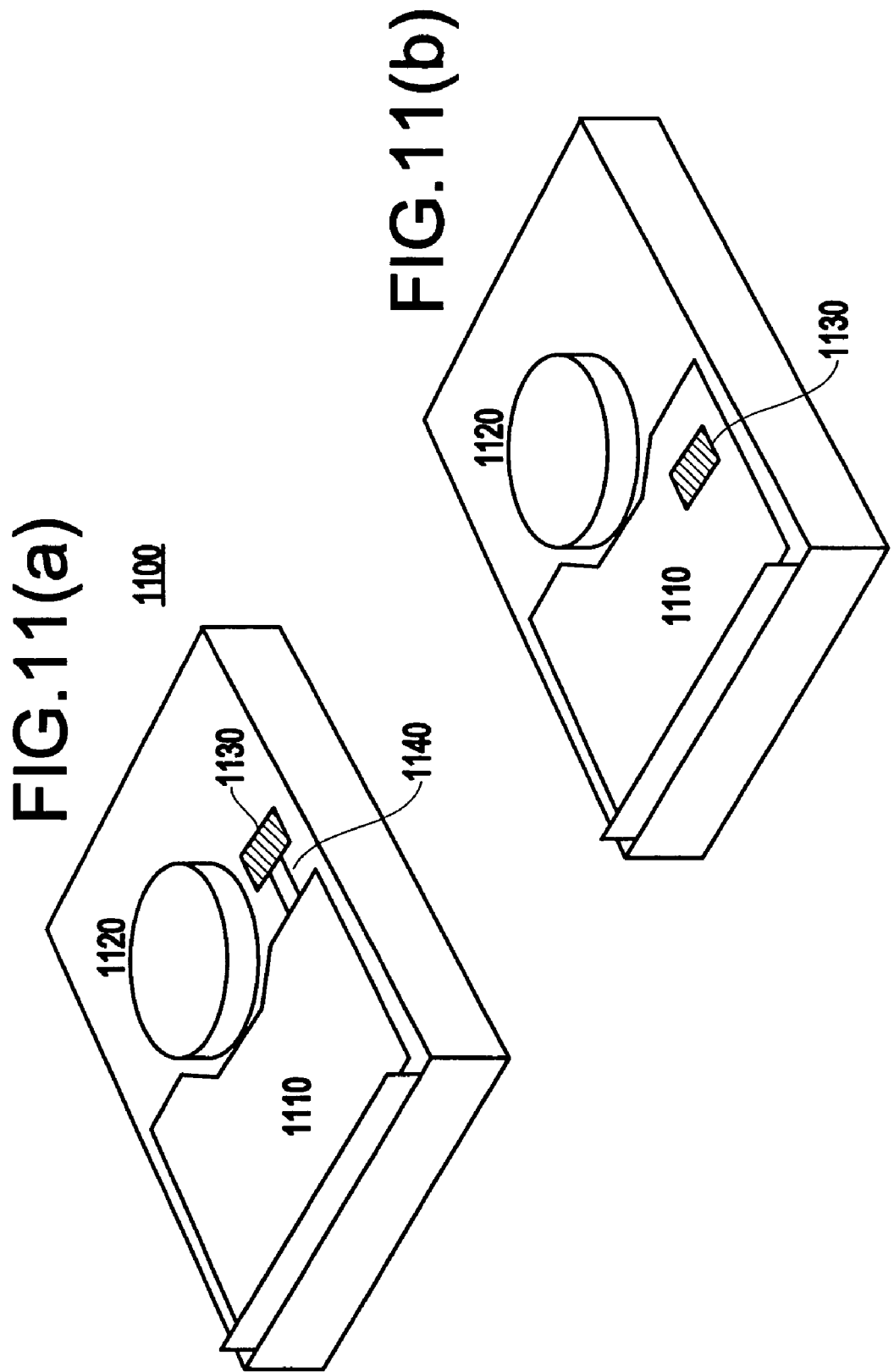

ROTATIONAL VIBRATION VELOCITY-BASED SENSOR FOR DISK DRIVES

CROSS-REFERENCE TO RELATED APPLICATION

The present application is related to U.S. patent application Ser. No. 10/153,684 filed concurrently herewith, to Sri M. Sri-Jayantha et al. entitled "METHOD AND SYSTEM FOR ROTATIONAL VELOCITY-BASED ALGORITHM FOR VIBRATION COMPENSATION IN DISK DRIVES", assigned to the present assignee, and incorporated herein by reference.

BACKGROUND OF THE INVENTION

1. Field of the Invention

The present invention generally relates to a disk drive, and more particularly to a disk drive which minimizes the track misregistration (TMR) error produced by theta-dynamics by a rotational vibration velocity-based sensor.

2. Description of the Related Art

The sustained data rate of a hard disk drive (HDD) is typically degraded in the presence of rotational vibration of a computer mounting system. Rotational vibration (RV) can result from random seek activity among a cluster of HDDs, and the customers have become concerned over the potential for performance degradation.

At high tracks per inch (TPI), the in-plane rotational vibration (theta coordinate) of a disk drive, referred to as "theta-dynamics", directly impacts the head positioning accuracy. A solution to this vibration challenge can be developed along several disciplines, ranging from novel mount systems to sophisticated sensors and servo algorithms. However, cost effective sensing of the rotational vibration (RV) velocity or acceleration is a problem, which the conventional structures have not found a solution to yet.

Rigid body motion of the base plate of a disk drive can take place along three linear (X, Y, Z) and three angular (phi, psi, theta) coordinates.

The present generation of 1.0", 2.5" and 3.5" hard disk drives (HDDs) are designed to operate in portable and desk-top/server environments, respectively. To reduce cost and weight of a computer system, manufacturers typically fabricate the HDD mounting frame utilizing thin structural members. Therefore, a computer frame is a compliant object which makes it susceptible to vibration. Such a mounting configuration makes a disk drive vulnerable to vibration excited by internal or external sources. An HDD with a rotary actuator system is highly sensitive to in-plane rotational vibration (RV) of its base plate.

Additionally, an HDD includes a head positioning servo system which performs three critical tasks.

First, the servo system moves the head to the vicinity of a target in a minimum time using a velocity servo under seek mode. Next, it positions the head on the target track with minimum settle-out time using a position controller without an integrating term (e.g., capability) in it. Finally, the servo system enters the track follow mode with a proportional-integral-derivative type (PID) position controller.

However, during the seek mode, maximum rotational acceleration torque followed by a deceleration torque is imparted by a voice coil motor (VCM)-based actuator. The corresponding reaction torque on the base-plate causes transient rotational vibration that can be detrimental to the positioning accuracy of the read/write heads. However, the presence of random vibration impacts the track following precision (and, slightly less, the settle-out performance).

Prior to the present invention, there has been no adequate addressing of the problem of random vibration as it critically affects the track following precision of an HDD actuator system.

Present 3.5" disk drives have reached 40 kTPI, and after year 2001 it is expected to grow beyond 50 kTPI. A major obstacle to raising the track density is inadequate head positioning accuracy in the presence of vibration disturbances. Due to exponential growth in TPI, positioning the read/write elements over a track has become a major challenge. Conventional servo control system requires continuous innovations to perform well under increasingly difficult operating conditions.

The mechanical components such as spindle motor assemblies are not perfectly mass-balanced, and during operation they produce harmonic vibration. Harmonic vibration excitation produces both a linear and a rotational oscillatory motion of the entire HDD system. When not compensated, a track following error of 15% of the track pitch can be detrimental to a disk drive's "soft" and "hard" error rate performance. The positioning error due to this internally produced periodic vibration can be solved using a servo method disclosed in U.S. Pat. No. 5,608,586, incorporated herein by reference.

By using special shock and vibration isolation mount design, the rotational oscillatory components due to internal spindle forcing can be minimized as taught by U.S. Pat. No. 5,400,196, incorporated herein by reference. However, a mount design optimized to decouple internal spindle vibration as disclosed by U.S. Pat. No. 5,400,196, remains susceptible to external input vibration. By deploying the isolation mounts along a polygon satisfying a particular set of criteria defined by Japanese Patent No. 2,565,637, the external vibration inputs generating rotational vibration on an HDD can be minimized.

In U.S. Pat. No. 6,122,139, also incorporated herein by reference, a method to neutralize the reaction by generating a counter torque using a secondary actuator is proposed. An HDD with a novel sensing and control solution could provide an enhancement to the problem of random vibration.

As shown in FIGS. 1A–1C, U.S. Pat. No. 5,721,457, incorporated herein by reference, shows a dual PZT configuration 101, 102 in a disk drive where the mass and inertia of the disk drive is exploited as the seismic body to measure angular and linear acceleration with substantial sensitivity.

That is, FIG. 1(a) illustrates a head disk assembly 100, FIG. 1(b) illustrates in greater detail the piezoelectric strain sensor 101, 102 for measuring acceleration, and FIG. 1(c) illustrates the head disk assembly 100 on a userframe 104 undergoing shock and vibration, with the dual PZTs 101, 102 providing an angular and linear acceleration inputs to a component 105, thereby resulting in a write inhibit signal being issued.

A key challenge in the use of PZTs is that they are sensitive to strain along multiple axes, and therefore they respond to vibration inputs in addition to the theta-dynamics.

To produce high fidelity signals in the range of 100–1000 Hz, the size of a PZT configuration must be large and such a design is not compatible with the electrical card height and manufacturing requirements in a disk drive. On the other hand, reducing the PZT volume produces poor signal quality (i.e., particularly the signal drift in the low frequency range (~100 Hz) is not easily stabilized).

The measurement-based experience of the present inventors is that the signal stability and noise are key problems in employing a compact PZT configuration. Sudden drift in a PZT signal can cause undesirable write-abort condition. Use of dual PZTs further complicates the problem of matching the individual PZT gain and thermal sensitivity. By providing novel mechanical structures, the sensitivity of a PZT can be enhanced along the desired direction and minimized along the remaining directions. However, the stringent decoupling requirements of dynamics makes the cost of a dual PZT sensor cost prohibitive for a disk drive application.

By deploying dual PZT sensors 201, 202, as shown in FIG. 2, and a signal conditioning algorithm, a conventional system 200 (e.g., see A. Jinzenji et al. "Acceleration feedforward control against rotational disturbance in hard disk drives," APMRC-Nov. 6–8 2000, TA6-01–TA6-02; U.S. Pat. No. 5,426,545 to Sidman et al., incorporated herein by reference) demonstrates a feedforward solution to random vibration. PZT sensors 201, 202 by themselves do not produce high quality output without additional innovation. Figure also illustrates a feedforward compensator 203 and a conventional servo 204.

An alternative approach uses a capacitive sensing micromechanical device (e.g., see C. Hernden, "Vibration cancellation using rotational accelerometer feedforward in HDDs," Data Storage, November, 2000, pp.22–28), which attempts to produce a quality theta-acceleration sensor. However, sensor size, bandwidth and cost are considered to be limitations of a microelectromechanical sensor (MEMS).

Thus, the conventional sensors have been unable to deal adequately with the problem of random vibration, as it critically affects the track following precision of an HDD actuator system, and no sensor has been produced with is cost effective and effective for sensing rotational vibration (RV) velocity or acceleration.

SUMMARY OF THE INVENTION

In view of the foregoing and other problems, drawbacks, and disadvantages of the conventional methods and structures, an object of the present invention is to provide a method and structure in which the problem of random vibration, as it critically affects the track following precision of an HDD actuator system, is addressed.

Another object of the present invention is to minimize the TMR error produced by theta-dynamics by using a rotational vibration velocity-based sensor.

In a first aspect, a disk drive (HDD) subject to linear and rotational vibration, includes an independent sensing unit for sensing a rotational velocity component of the HDD rotational vibration in a predetermined frequency range.

In a second aspect of the present invention, a disk drive system, includes a main voice coil motor (VCM), and a back-electromotive force (EMF) sensor which is rotatable around a point and is substantially insensitive to linear vibration which selectively shares a flux of the main VCM.

Thus, the inventors have recognized that rotational vibration of the baseplate in the plane of a disk platter causes tracking error due to limited servo feedback gain. A sensor having an inertially dominant "pivot-beam" structure is developed to measure the angular velocity of the base-plate by a single magnetic EMF (electro motive force) generator.

Thus, the conventional structures use dual piezoelectric (PZT) sensor based acceleration feed forward solution. Such a PZT sensor system is prone to registering a portion of linear vibration as rotational vibration signal. In contrast, the EMF-based velocity sensing of the present invention is less prone to undesirable linear vibration pick up.

Since an EMF-sensor is operated in voltage sensing mode with virtually zero current needed for amplification, the signal conditioning requirements are less stringent, less sensitive to thermally-induced resistance variation, and less costly compared to a charge generation-based PZT sensor method. The angular displacement required to detect RV motion is only a fraction of a degree and therefore a flexure based pivot system is ideally suitable for this sensor.

Further, sensor geometry is optimized to give maximum sensitivity to angular motion and minimum sensitivity to vibration along all other coordinates. By sharing the magnetic air gap flux of the main VCM, cost of the sensor is minimized. By supporting the sensor by flexural bearings, the cost of the pivoting function is further reduced. By adapting a lever arm of an inertial latch, the sensor function can be achieved at least cost.

Thus, the rotational vibration (RV) velocity-based servo compensation sensor system of the present invention is advantageous over the conventional arrangements.

BRIEF DESCRIPTION OF THE DRAWINGS

The foregoing and other purposes, aspects and advantages will be better understood from the following detailed description of a preferred embodiment of the invention with reference to the drawings, in which:

FIG. 3(a) illustrates a feedforward loop in a disk drive 300 incorporating a back EMF sensor 302, and FIG. 3(b) illustrates the back-electromotive force (EMF) sensor 302 of FIG. 3(a) in greater detail;

FIGS. 5(a)–5(d) illustrate a flexural pivot for a back EMF sensor 500;

FIGS. 9(a)–9(b) illustrate an arm supporting the back EMF coil is shared by the latch system assembly;

FIGS. 10(a)–10(c) illustrate a back EMF sensor configured external to the drive assembly with maximum inertia arm;

FIGS. 11(a)–11(b) illustrate a back EMF sensor located in proximity to the electrical circuit card assembly;

DETAILED DESCRIPTION OF PREFERRED EMBODIMENTS OF THE INVENTION

Figure 1:
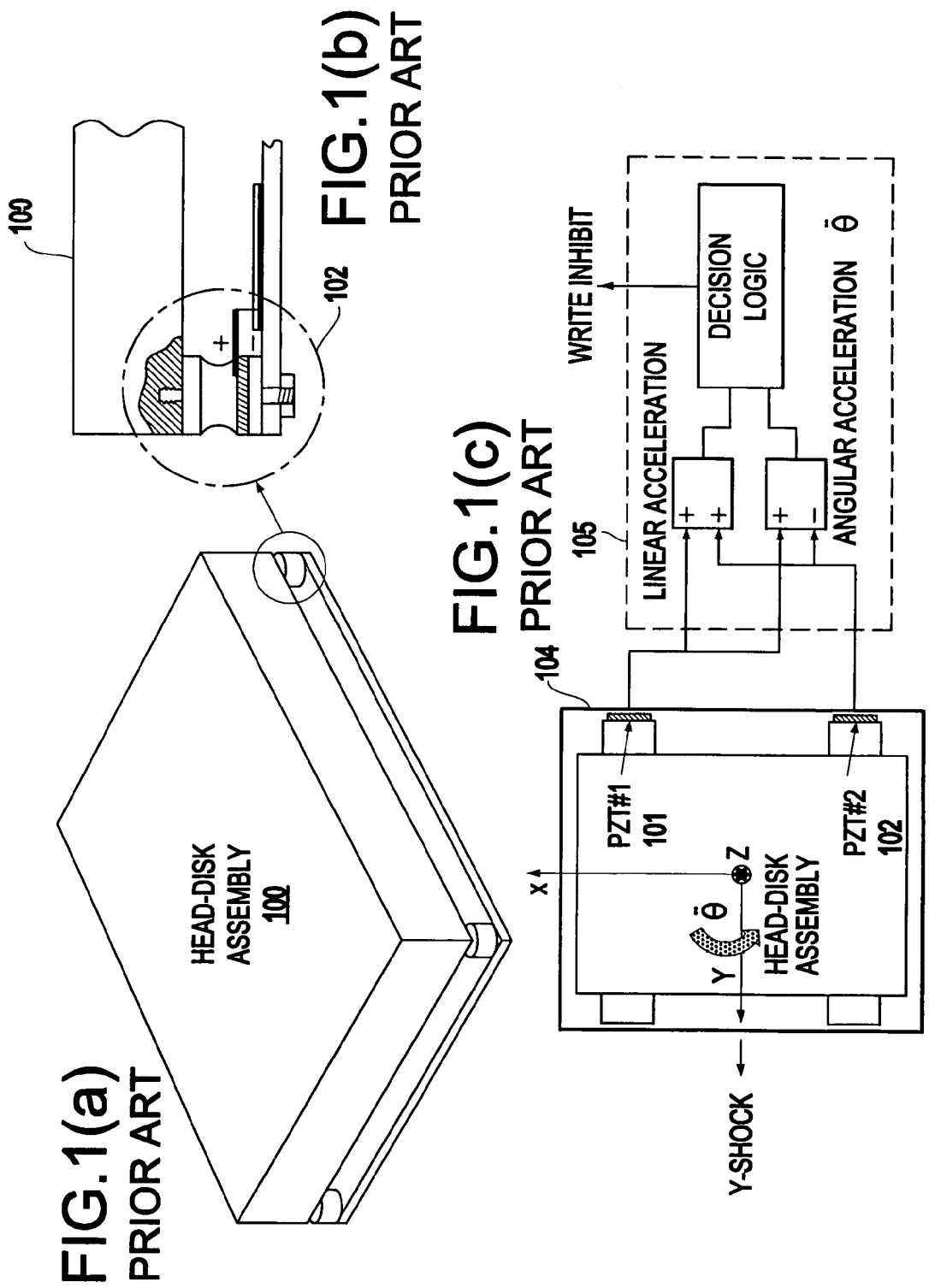
FIGS. 1(a)–1(c) illustrate the use of dual PZT sensors 101, 102 to detect angular acceleration as in a conventional arrangement.
Figure 2:
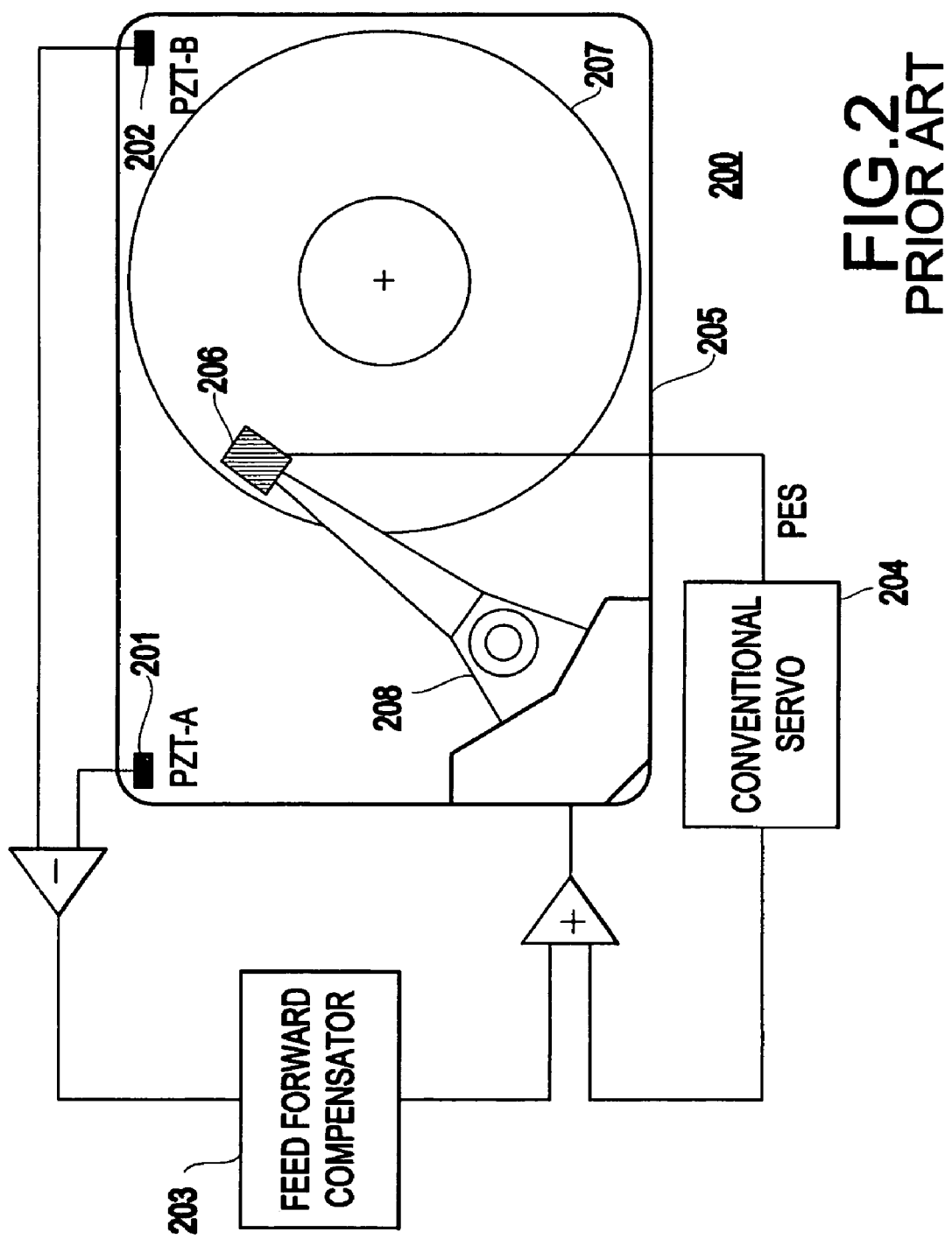
FIG. 2 illustrates an acceleration feed forward control using a PZT sensors 201, 202 in a conventional arrangement.

Referring now to the drawings, and more particularly to FIGS. 3(a)–27(b), there are shown preferred embodiments of the method and structures according to the present invention.

Preferred Embodiment

Turning to FIGS. 3(a) and 3(b), an actuator of a disk drive 300 generates a reaction torque during a seek. In computer configurations where there are multiple drives arranged in the form of an array, the multiple reactions produced by the drives generate a vibration spectrum.

The form and magnitude of a vibration (e.g., both linear and rotational) spectrum is system-specific, but it tends to be a band-limited power spectrum interspersed with a finite number of harmonics. The base-plate vibration, especially along X, Y and about Z (e.g., coordinate theta) can contribute to TMR.

As mentioned above, a major contribution to TMR comes from theta-dynamics. The actuator mass imbalance contributes to TMR through the torque disturbance produced by the linear vibration of the actuator pivot, but nominally the imbalance amount is negligible.

Compliance of the spindle motor bearing can also produce undesirable TMR due to X, Y vibration of its axis of rotation. The spindle bearing component is expected to become worse in the case of a fluid dynamic bearing instead of ball bearings.

The present invention strives to minimize the TMR error produced by theta-dynamics by using a rotational vibration velocity-based sensor. As shown in FIG. 3(a), the disk drive 300 includes a rotationally-sensitive back EMF sensor 302 which is used to develop and demonstrate the effectiveness of the algorithm presented in the above-mentioned copending U.S. patent application Ser. No. 10/153,684, incorporated herein by reference.

The terms "feedback" and "feedforward" refer to general principles known in the field of control systems. The conventional systems (e.g., as disclosed in U.S. Pat. No. 5,400,196 and Japanese Patent No. 2,565,637) employ a feedforward method in which the angular acceleration of the baseplate is measured, and the same angular acceleration is applied to the actuator arm to reduce or eliminate the corresponding TMR component. The measured RV acceleration is modified by a gain parameter (with a noise reduction process), and is applied to the VCM actuator.

Thus, to realize a solution, a good quality RV acceleration sensing technology is required, as disclosed below. The algorithm used in itself is simply a gain adjusting operation. Nevertheless, due to signal conditioning needs, innovation can be made to enhance the feedforward algorithm, for example, in the area of signal noise reduction.

The present invention preferably uses a back EMF-based RV velocity sensor which is easy to develop and less costly to fabricate. The present inventors have recognized that any limitations posed by an acceleration sensor can be removed if an algorithm (e.g., a method) can be found that will exploit an RV velocity sensor. Such a sensor is disclosed hereinbelow.

A velocity sensor that will only be sensitive to angular motion along the theta-coordinate can be designed using the same experience in designing a disk drive main VCM actuator. Therefore, a novel back EMF sensor or the like is pursued in the present invention.

An industry grade computer housing tends to have TMR producing resonance in the range of about 100 to about 1000 Hz. The storage industry trend is to produce disk drives that have shorter than 10 ms full seek time and less than 5 ms ⅓ seek time. This characteristic trend implies that the random excitation frequency is expected to be not lower than 100 Hz. On the highest frequency spectrum, a single track seek of 1 ms corresponds to 1 kHz (and the strength of the seek pulse is not as severe as that of a full seek.)

Therefore, the random vibration excitation at any point on a computer frame is bound to be between about 100 Hz to about 1 kHz. A cooling system such as a fan produces a 60 Hz vibration which is handled by the conventional servo loop. Therefore, the worst case excitation is likely to be within 100–1000 Hz, with most likely events occurring around 200–800 Hz range due to ⅓ or shorter seek lengths.

Thus, the present invention aims to develop a sensor for use with a method that is effective in its feedforward mode (e.g., preferably in the 100–1000 Hz range). The realization that the method/sensor need not be effective in the lower (<100 Hz) and upper frequency (>1000 Hz) ranges makes a RV velocity-based sensor solution feasible in the case of an HDD. This non-obvious requirement facilitates a practically realizable solution. Any reference to middle frequency band in this invention corresponds to 100–1000 Hz.

Thus, the inventors have recognized that by using an inertially dominant pivotable member carrying a coil winding held an air gap flux, the relative angular vibrational motion of the flux with respect to the coil can be detected by a back EMF voltage.

Turning again now to FIGS. 3(a)–3(b) in detail, FIG. 3(a) shows a disk drive 300 for incorporating a sensor 302 that provides a back EMF voltage which is proportional to the rotational velocity of the base plate of a disk drive. An algorithm, optimally designed in the above-mentioned copending application, generates a feed forward signal that is added to the conventional servo signal to drive the main VCM. The details of the back-EMF sensor 302 are shown in FIG. 3(b).

As shown in the disk system 300 of FIG. 3(a), the RV velocity of a base-plate 301 is measured by the back EMF sensor 302 (shown in greater detail in FIG. 3(b)), and the voltage produced by the sensor 302 may be amplified (e.g., by a high gain amplifier) (not illustrated) and digitized (e.g., by a feedforward controller 352) for an internal algorithm to operate on. A conventional servo 353 is also shown for receiving the position error signal (PES) from the head 306 and coupled to provide an input to an amplifier (integrator) 354.

Turning now to FIG. 3(b) in detail, the back-EMF sensor 302 may include a coil 3021 for back EMF sensing, magnets 3022 for producing an air gap flux, a low friction pivot 3023 which facilitates good dynamics of a moving member (e.g., an inertial beam 3026 discussed in further detail below) at a substantially low frequency range without becoming corrupted by friction or the like, a mass balance 3024 for making the center of gravity of the moving system to coalesce with the low friction pivot point 3023, a shroud 3025 for providing against an airflow induced vibration and electromagnetic interference, and a moving member (e.g., an inertial beam) 3026. It is noted that the inertial beam may need to be shielded from aerodynamic and electromagnetic interference to minimize undesirable degradation in its signal quality due to spurious events other than true rotational vibration, and thus the shroud 3024 is provided.

It is noted that the structure of the sensor configuration of FIG. 3(b) is merely exemplary and the invention is not limited thereto.

Thus, the structure of FIGS. 3(a) and 3(b) take into account (and attempts to overcome) that measuring/sensing the angular acceleration can be costly and sometimes inappropriate, since the motion may take the form of not only in-plane motion, but also simultaneously may take the form of linear vibration along many coordinates. Hence, cross-coupling may occur with the use of the conventional PZT sensors.

The inventors have recognized that the conventional PZT sensor has such problems, and thus have developed the method disclosed herein with the back-EMF sensor which functions on a different principle from the PZT sensor.

It is noted that, while a structure of a back-EMF sensor and moving a coil in a magnetic field and a back-EMF is picked-up (e.g., a basic physics principle) are generally known, there has been no known use of a back-EMF sensor for detecting angular motion/acceleration in a disk drive.

Thus, applying a back-EMF for the purposes of the present application/problem (e.g., detection of the rotational/angular motion in a disk drive) is novel and unique. Indeed, the actuator itself pivots around a point and if one moves the actuator and uses a voltage meter thereat, a voltage signal will be produced. However, no such configuration has been used in such a mode from the actuator standpoint (or employed before).

Thus, the invention uses the flux intersecting a coil (or a moving coil intersecting a flux) to obtain a back EMF proportional to a rate of change of flux. As such, the invention is directly sensing a rotational velocity as a transfer function process. This is an important distinction over the conventional sensors.

That is, it is noted that it is possible to obtain the acceleration and to integrate once to obtain the velocity, as is known. However, when acceleration is integrated to obtain the velocity numerically, then residual bias results, which increases over a period of time. Direct sensing with a sensor such as that of the invention, avoids such problems occurring (e.g., since there is no integration of the acceleration term). Thus, the fundamental transfer function process is important in each of these sensing systems. Hence, whereas the conventional system use a plurality of discrete piezoelectric sensors to obtain the angular rotation (e.g., as in FIGS. 1(a)–2(b), the invention uses a direct-sensing sensory, and hence is much more robust by using a rate of change of flux.

Figure 4B:
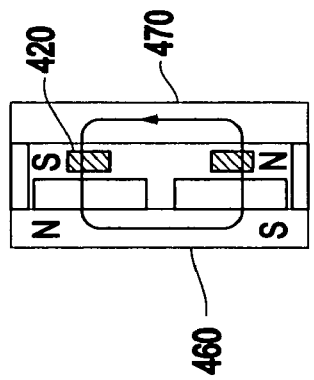
FIGS. 4(a)–4(c) illustrate elements of a back EMF sensor 400.
Figure 4C:
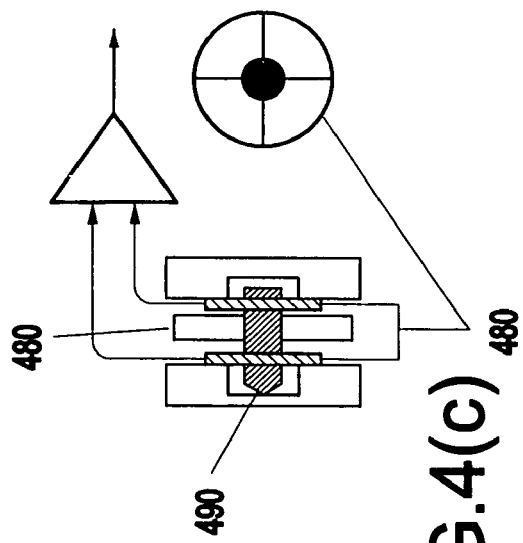
Figure 4A:
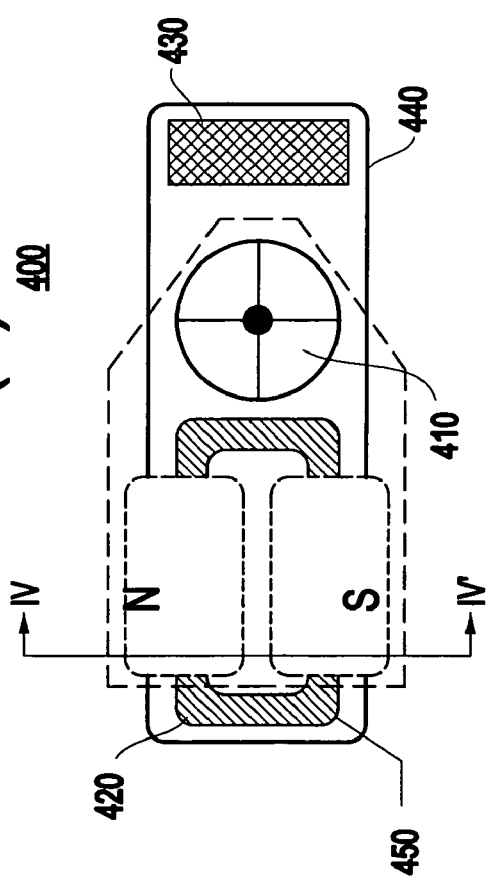

FIGS. 4(a)–4(c) show the elements of a back EMF sensor 400, similar to that of FIG. 3(b), designed to detect rotational motion about a low friction pivot axis 410.

For clarity, FIG. 4(a) does not show a top yoke. The maximum sensitivity of the sensor 400 (e.g., voltage per unit angular acceleration) is achieved when both sides of a coil 420 (including multi-turn thin cross section wire) are made to participate in the back EMF generation process. Thus, the air gap flux is produced by providing a pair of permanent magnets with an appropriate polarity, as shown in the FIG. 4(a). Sensor 400 also includes a mass 430 for center of gravity balancing, a sensor beam 440 and a back EMF pickup 450.

FIG. 4(b) illustrates a cross-sectional view of the structure of FIG. 4(a) along lines IV–IV' of FIG. 4(a), and shows a top yoke 460, as well as flux lines 470.

It is noted that the pivot design can be achieved in many ways. For example, FIG. 4(c) shows a case where a pair of flexure assemblies 480 provide rotational (yaw) freedom while limiting linear X-Y motion as well as pitch and roll motion.

More specifically, a flexured pivot inner hub is attached to a shaft 490 and an outer ring is attached to the yoke. The two flexure assemblies 480 can carry electrical links from the coil. The shaft 490 is a preferably a preloaded shaft with a point contact (insulator body) provides Z-stiffness. It is noted that enhanced Z-stiffness, and hence the need for a preloaded shaft against a hard surface may not be mandatory if the magnetic flux linkage of the coil windings for Z-mode vibration is acceptably insignificant.

The electrical connection to the back EMF coil can be achieved through the two flexure assemblies 480, as shown in FIG. 4(c), in which case the shaft supporting the flexure assemblies 480 must be electrically nonconductive.

Since rotational vibration is limited to about 50 rad/s$^2$, and most of the angular vibration should be measured in the range of 100 to 1000 Hz, the maximum angular excursion of the inertial beam is expected to be less than 0.01 degree. On the other hand, due to seek-induced settle dynamics, the base plate excursion could be as high as about 0.1 deg. Therefore, a large angular displacement pivot is not mandatory. A flexured system has the potential to provide a low cost, frictionless pivot assembly.

FIGS. 5(a)–5(c) show various views of such a flexured system having a flexured pivot 510 of a sensor 500 having a multi-turn thin cross-sectional wire (coil) 515, a sensor beam 520, and a mass 530 for center of gravity balancing.

As shown in FIG. 5(b), the pivot material 510 can be made of a sheet metal assembly with visco-elastic damping, or the whole pivot 510 itself can be made of plastic that has intrinsic damping property. For example, the pivot may include a plurality of flexure members 5101 coupled to an inner hub 5102 attached to a yoke/base plate assembly (not shown).

FIG. 5(c) illustrates a side view of one of the thin flexure members 5101 of FIG. 5(b). Temperature sensitivity of the sensor characteristics and cost of components are preferably balanced in choosing the appropriate flexured pivot material.

FIG. 5(d) shows the flexures 5101 assembled onto the inner hub and an example of routing the coil's electrical connections and the electrical links 5103 from the coil.

Thus, the structure of FIGS. 5(a)–5(c) presents a low-cost flexure system which is stiff in five (5) coordinates and maximally free in plane rotation.

Since the back EMF sensor function requires an air gap flux, the magnetic flux that is already present in the main VCM actuator can be shared by the sensor assembly, thus reducing the cost of a separate magnetic circuit. Thus, by sharing the main VCM's magnets, the cost of the magnets of the sensor including the manufacturing thereof, can be reduced. Further, space savings are realized.

Figure 6:
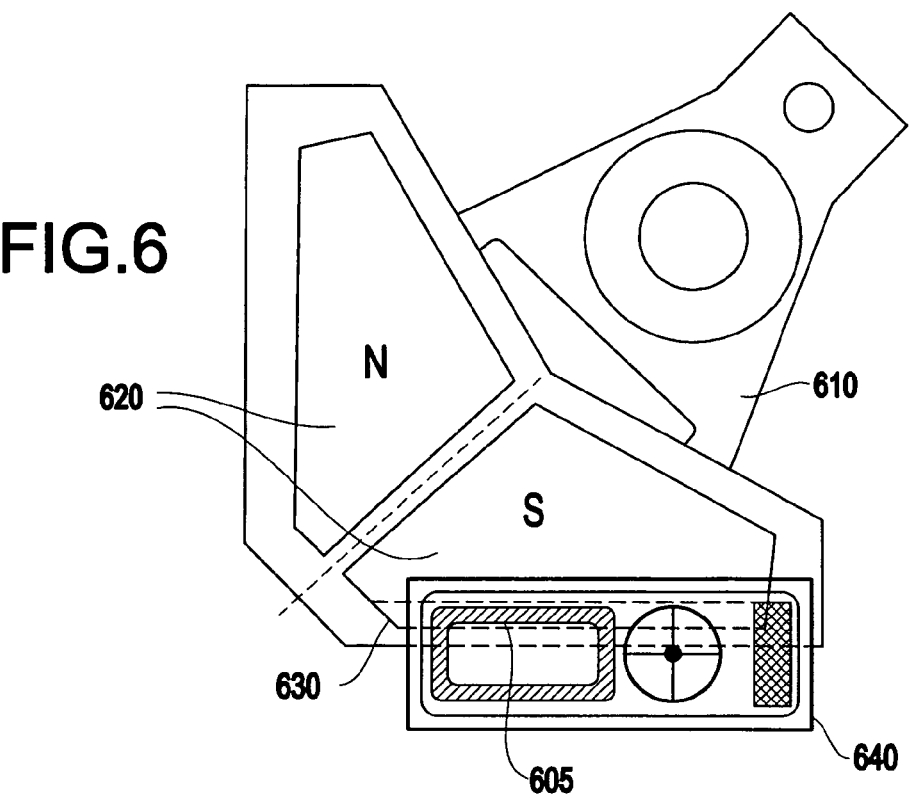
FIG. 6 illustrates a position of a back EMF sensor which shares a common air gap flux of the VCM.
Figure 7:
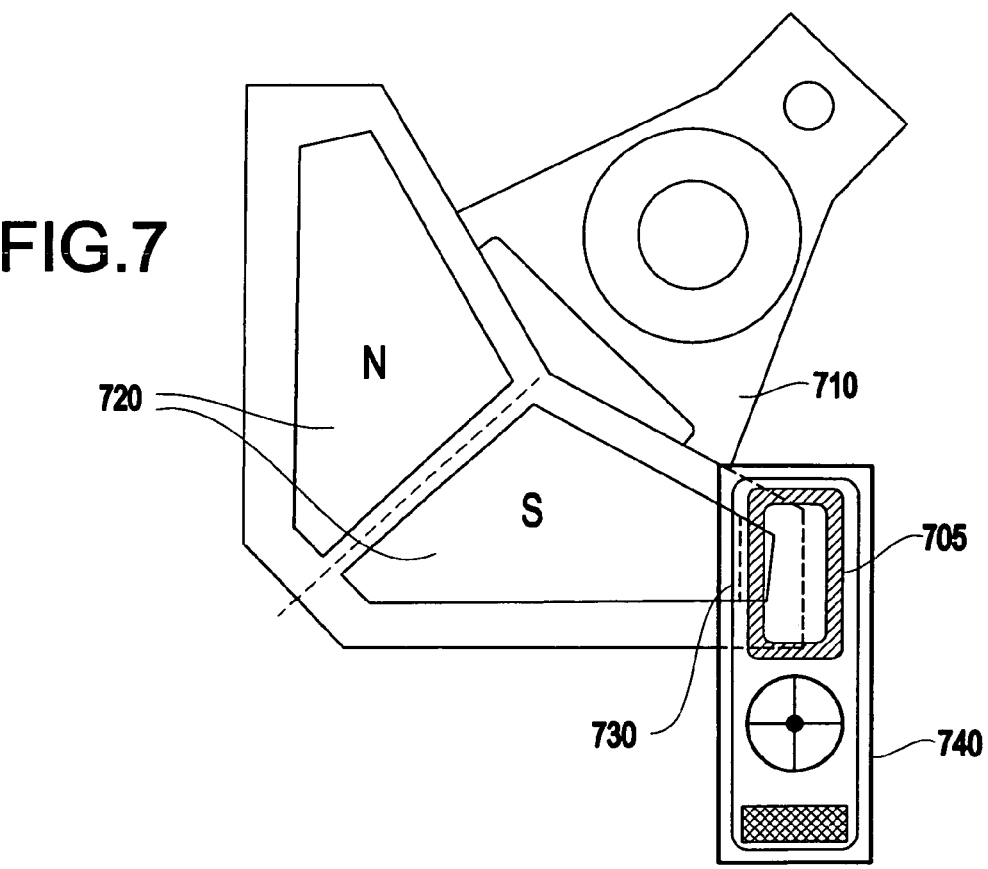
FIG. 7 illustrates another position for a back EMF sensor with independent support for the pivot point.
Figure 8:
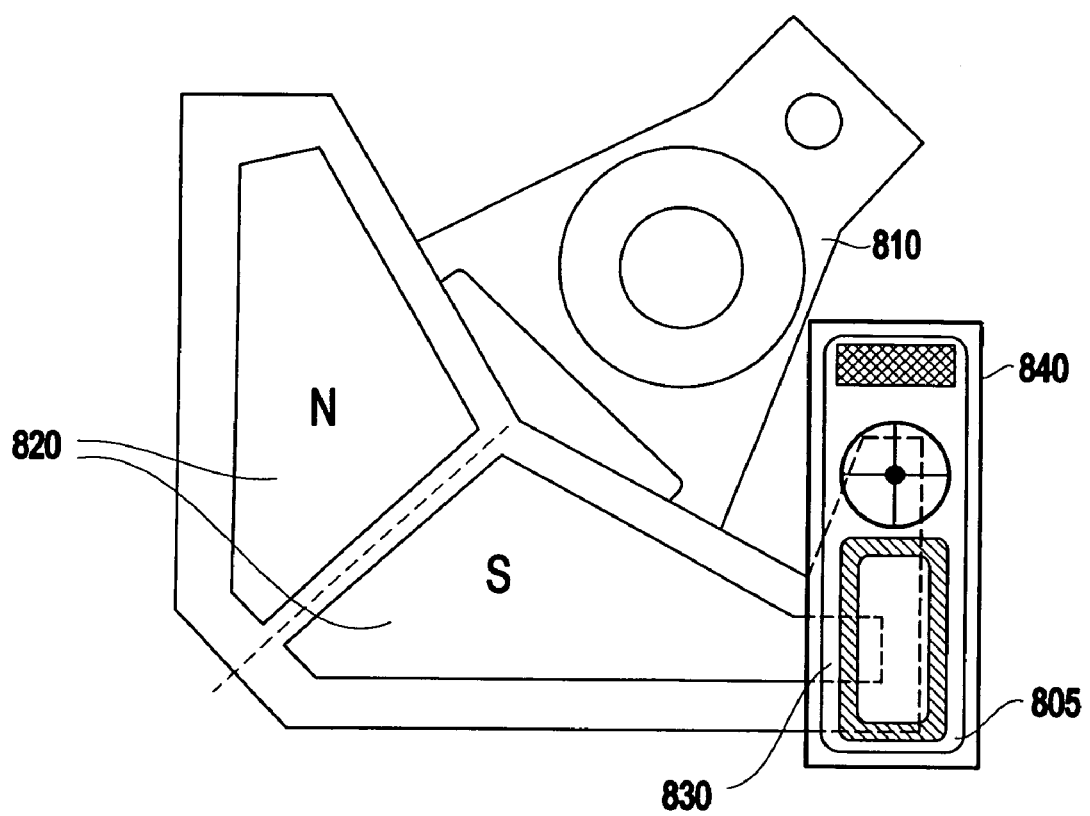
FIG. 8 illustrates a pivot point of the back EMF sensor which is provided by the yoke system of the main VCM.

FIGS. 6–8 show various locations of positioning the inertial beam, depending on the space availability within a disk drive.

For example, FIG. 6 illustrates a case in which the back EMF coil 605 can share the air gap of a main actuator arm and coil 610. A conventional magnet pair 620 is provided for forming the main actuator's air gap. The VCM magnet may be extended (e.g., see reference numeral 630) as shown. A shroud 640 is provided against airflow induced vibration and electromagnetic interference (EMI). Thus, the back EMF sensor is formed behind the magnets of the main VCM.

FIG. 7 illustrates a configuration in which a back EMF coil 705 can share the air gap of a main actuator arm and coil 710. A conventional magnet pair 720 is provided for forming the main actuator's air gap. The VCM magnet may be extended (e.g., see reference numeral 730) as shown. A shroud 740 is provided against airflow induced vibration and electromagnetic interference (EMI).

Thus, the back EMF sensor is positioned so as to form an inductive coupling with the main coil and specifically is formed to the side of the magnets of the main VCM. This arrangement can be used advantageously where space is available to the side of the main VCM coil as opposed to behind it (as in FIG. 6). Thus, the manufacturability of the present invention is enhanced.

FIG. 8 illustrates a back EMF coil 805 which can share the air gap of a main actuator arm and coil 810. A conventional magnet pair 820 is provided for forming the main actuator's air gap. The VCM magnet may be extended (e.g., see reference numeral 830) as shown. A shroud 840 is provided against airflow induced vibration and electromagnetic interference (EMI). Thus, the back EMF sensor is formed to the side of the magnets 820 of the main VCM.

FIG. 8 further exemplarily shows how the pivot can be supported, and specifically the extended yoke can be used to support the pivot assembly. This integrated structure prevents alignment issues from arising in the Z-axis direction between the magnets and the pivot point. Thus, the structure is integrated with the main VCM, thereby providing many manufacturing advantages.

During a high current-based seek, certain amount of magnetic interaction through air gap flux can be expected, thus causing a parasitic component in the sensed back EMF voltage. Since the RV robustness is required primarily during track-follow operation, the sensor feed forward can be temporarily suspended during a seek operation. This is best achieved by continuing to keep the sensor driving the feed forward algorithm, but the output of the algorithm can be disabled from the main VCM drive, thus preventing artificial transients when the feed forward is activated.

Many newer HDDs include an inertial system latch 900, as shown in FIG. 9(a) to constrain shock induced actuator motion under a power-off condition. Thus, for example, such a latch (e.g., a so-called "bidirectional latch") is to protect the HDD from accidents such as when the user drops a notebook computer or the like incorporating the HDD. Such a latch system includes a latch 910 having a spring 920 coupled thereto. The latch 910 couples to a lever 930 via a contact point 940. The latch 910 latches an actuator coil 950, as shown adjacent to the actuator magnet 960, and is activated by sudden acceleration. The lever 930 is inertially relatively heavier than the latch 910, and when there is an accident, the lever 930 tends to push the latch 910 toward the latching position (e.g., the locked position) independent of the rotation direction (e.g., a bidirectional latch).

However, the cost of the back EMF sensing function can be reduced further by the structure 970 which exploits one of the preexisting arms of the inertial latch 910 to support the coil winding, as shown in FIG. 9(b).

FIG. 9(b) shows the rest point 975 in which there is no contact at the contact point 940. The inertial beam must however be held freely in a neutral position to pick up sensitive rotational vibration, instead of being preloaded against a stop. This requirement can be met by having a second soft-spring 980, as shown in FIG. 9(b). Thus, the spring 980 is for maintaining a neutral position of the lever 930 for no contact thereof. Also shown in FIG. 9(b) are the actuator magnet with an extension for the sensor air gap flux, and a low friction pivot 995.

In case the shock activated performance of the inertial latch mechanism is hampered by holding the coil-carrying beam in a neutral position, a two mode operation is envisioned. That is, by applying a mild bias current into the back EMF coil 985, a bias force can be generated to move the beam from a contacting rest position 975 (e.g., during power off state) to a free non-contacting neutral position against the second spring 980 (e.g., during power on state).

Thus, as compared to the structure in FIG. 9(a) which is preloaded, the structure/beam of FIG. 9(b) is not pre-loaded but it is kept floating with the second spring, and thus it is an inertially high quality device (e.g., small vibrations). Hence, for small vibrations, the structure/beam is supported only by the low friction pivot, whereas for large vibrations (e.g., large motion like shock, etc.) it will work similarly to the conventional lever/latch device shown in FIG. 9(a). Hence, by adding a coil to the structure of FIG. 9(b), a compact, low cost back EMF sensor configuration can be obtained.

Referring to FIGS. 10(a)–10(c), for applications where the inertial mass of the moving member must be increased for increased sensitivity at lower frequency, the unused external space around the spindle motor base area of the base plate can be used.

That is, FIGS. 10(a) and 10(b) show an exploded view and an assembled view of the base plate 1000 and spindle motor area (unreferenced), including an upper yoke 1010 for the flux path, a rotating element 1020 carrying magnets 1030, back EMF coils 1040 embedded on a circuit card and a lower yoke 1050 for flux return. FIG. 10(b) again shows the finished assembly including a low friction pivot 1060 and a main circuit card 1070. FIG. 10(c) illustrates the situation of a rotating element 1080 carrying coils.

Each case above shows a moving magnet and a moving coil-based sensor configuration. However, referring to FIG. 11(a), a structure 1100 is shown in situations where proximity to an electrical card 1110 of the disk drive (head disk assembly) 1120 is desired, a compact back EMF sensor 1130 can be positioned and connected as shown. The shortest electrical connection to the card is shown at reference numeral 1140.

FIG. 11(b) illustrates that, in an ultimate application, a thin form factor sensor design can be used and the same sensor assembly 1120 is added directly onto the electrical card 1110. Thus, the back-EMF sensor 1130 can be mounted near the card (e.g., on the back side of the baseplate and connected to the card), mounted directly on the card, or for that matter can be mounted integrally in/part of the card 1110.

With a back EMF sensor constructed from a 2.5" form factor drive components, the feasibility of the concept can be demonstrated. That is, the measured frequency transfer function (TF) of a back EMF sensor is shown in FIGS. 12(a) and 12(b).

Figure 12A:
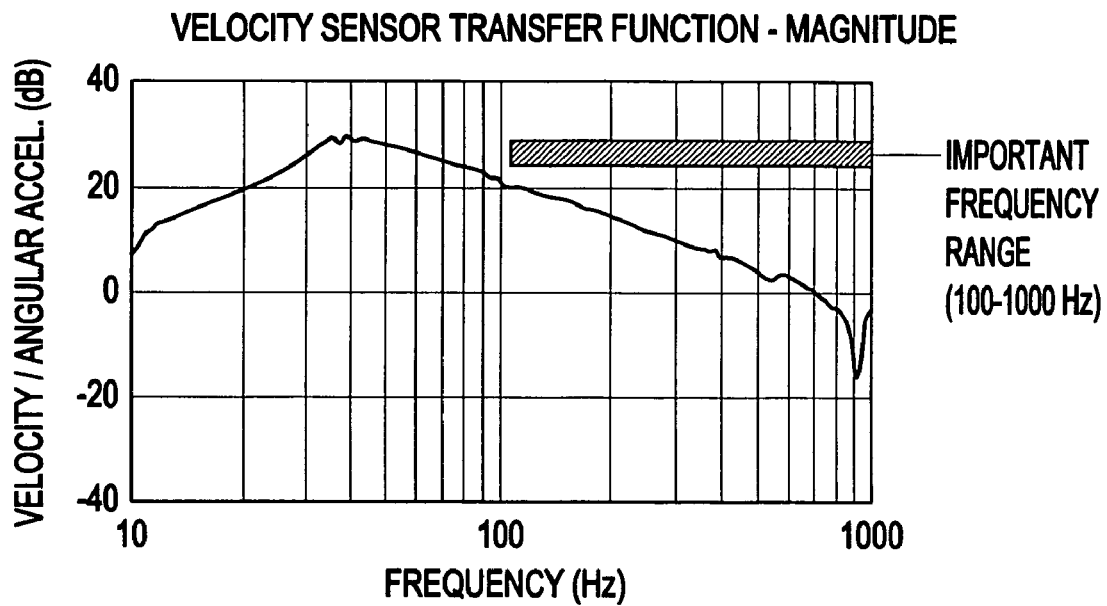
FIGS. 12(a)–12(b) illustrate a measured transfer function of a back EMF sensor (input=RV acceleration, output=back EMF; Angular velocity/Angular acceleration) according to the invention.
Figure 12B:
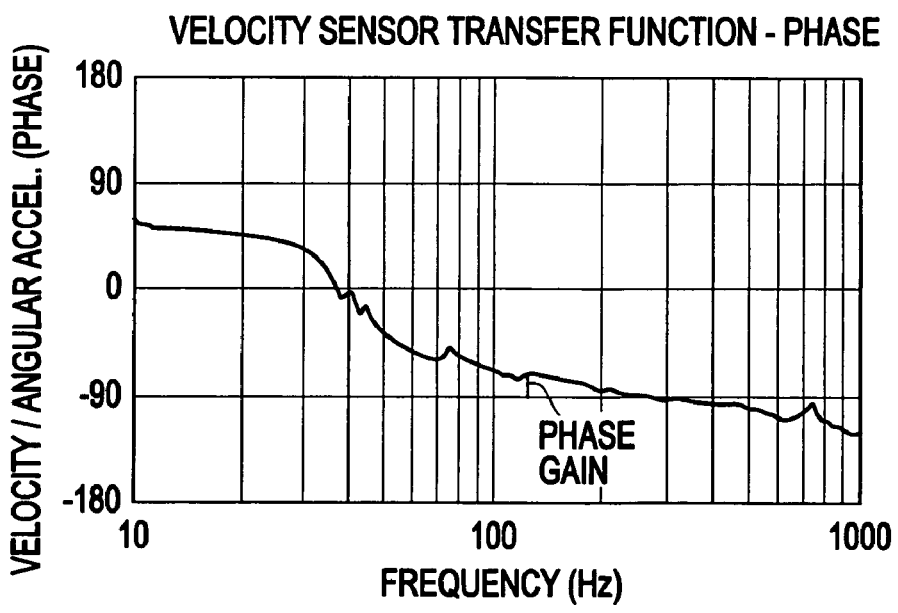

In FIG. 12(a), the input for the TF is an angular vibration excitation and the output is the induced voltage from the windings (amplified by a gain factor of 1000). It is observed that the resonance frequency of this sensor design is about 45 Hz. It is known that a conventional ball bearing pivot exhibits a spring-like behavior at small displacements giving rise to 45 Hz resonance.

In the frequency range from 100 to 1000 Hz, the −20 dB decade roll-off of the transfer function confirms the integrating effect in which the rotational acceleration input is converted to a rotational velocity output as reflected by the back EMF voltage. The damping present in the pivot assembly makes the phase of the TF to approach −90 deg. asymptotically. This gradual phase change near the −90 deg. ordinate can be constructively used to improve feedforward effectiveness by counterbalancing the phase lag inherent in the digital realization of the algorithm. It is noted that, with the sensor's damping characteristics, the phase gain (lift), as shown in FIG. 12(b), of the sensor is advantageous and beneficial, and can be exploited.

When a conventional ball bearing pivot is employed to achieve the angular inertial freedom for the sensor, the bearing may remain in a "stuck" position due to extended power-off condition. It is understood that the pivot must be exercised by activating the sensing coil for a short period of time. By a driving an oscillatory current into the sensing coil, the bearings could be freed prior to rendering the sensor useful for RV measurement.

Figure 13A:
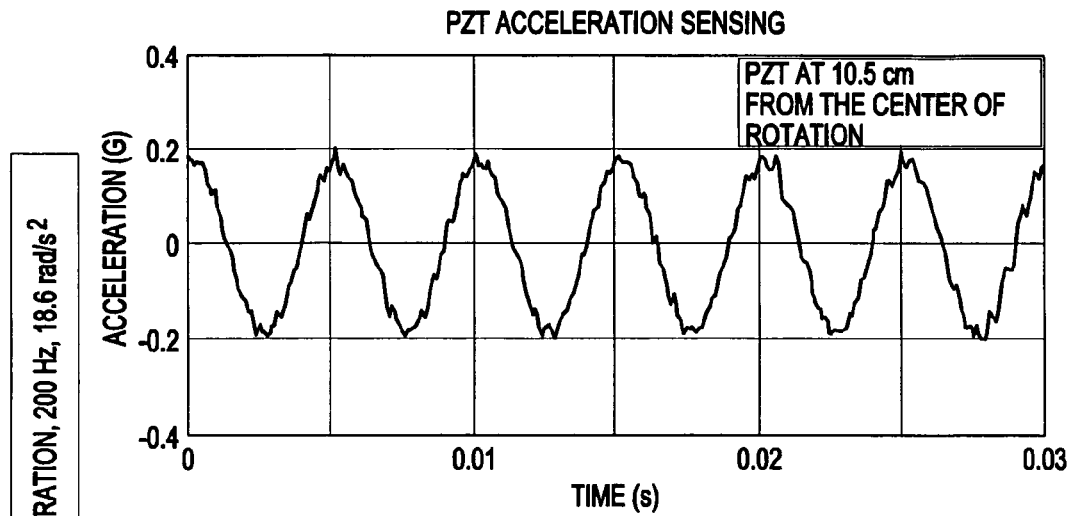
FIGS. 13(a) and 13(b) respectively illustrate a time domain output of a PZT sensor compared to a back EMF sensor for same input vibration.
Figure 13B:
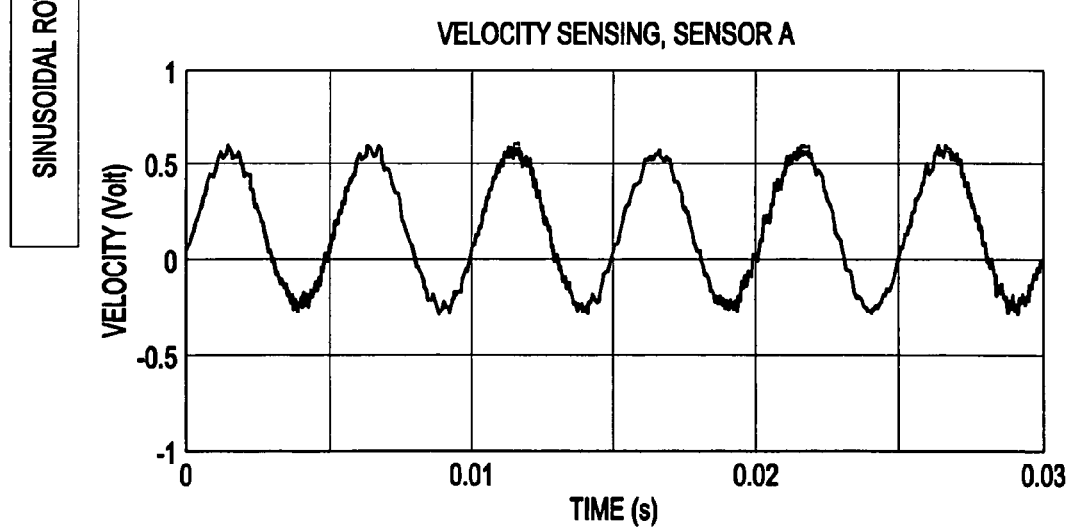

FIGS. 13(a) and 13(b) show the time domain output of the PZT sensor and sensor A (e.g., a back EMF sensor having a certain form factor as described farther below).

That is, FIG. 13(a) corresponds to a PZT sensor placed approximately 10.5 cm away from the center of rotation (e.g., shows angular acceleration as a function of time), and FIG. 13(b) corresponds to a back EMF sensor voltage (×1000 gain) mounted on the same vibrating table (and shows velocity as a function of time). The time traces show that the signals are qualitatively comparable. Even though the sensor output is amplified before it is used in a signal processing algorithm, no visible degradation due to noise pickup is evident.

Figure 14A:
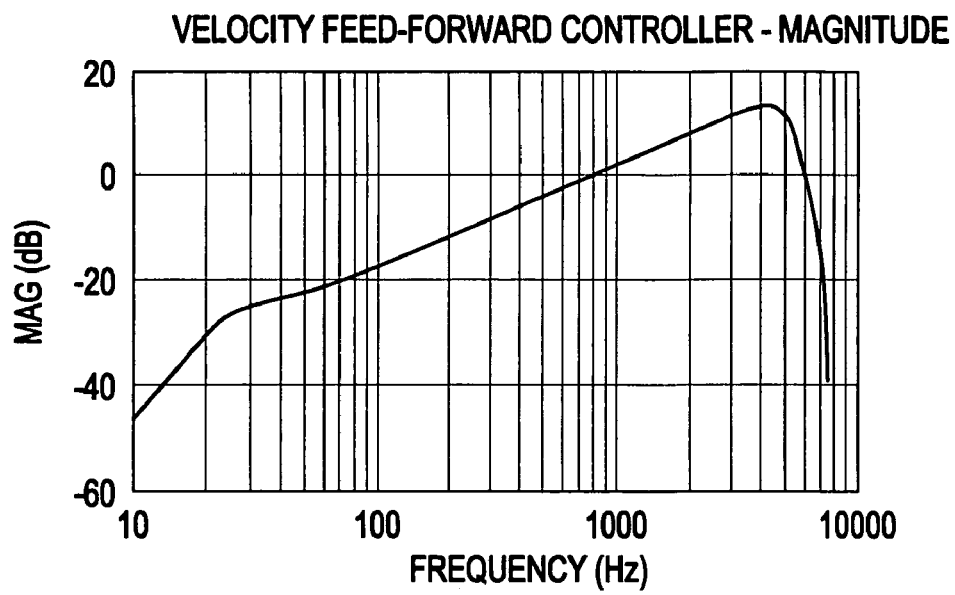
FIGS. 14(a) and 14(b) illustrate a feed forward control transfer function for a back EMF sensor.
Figure 14B:
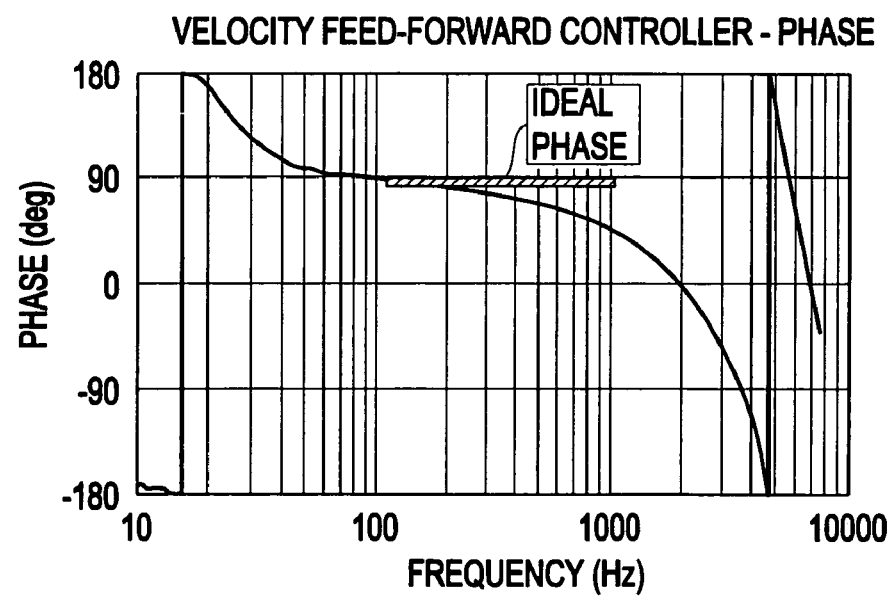

FIGS. 14(a) and 14(b) show the TF of a feed forward algorithm which includes a high pass, low pass and a phase lead filter implemented in a digital signal processing unit.

If programmability is not critical, then the filters can also be realized using analog electronic modules or a combination of analog and digital components. It is observed that the ideal phase is +90 deg. is required for the filter to emulate the function of a differentiator, but the need to suppress unwanted low and high frequency signals through high and low pass filters respectively causes phase distortion and introduces phase lag from the ideal target.

Figure 15:
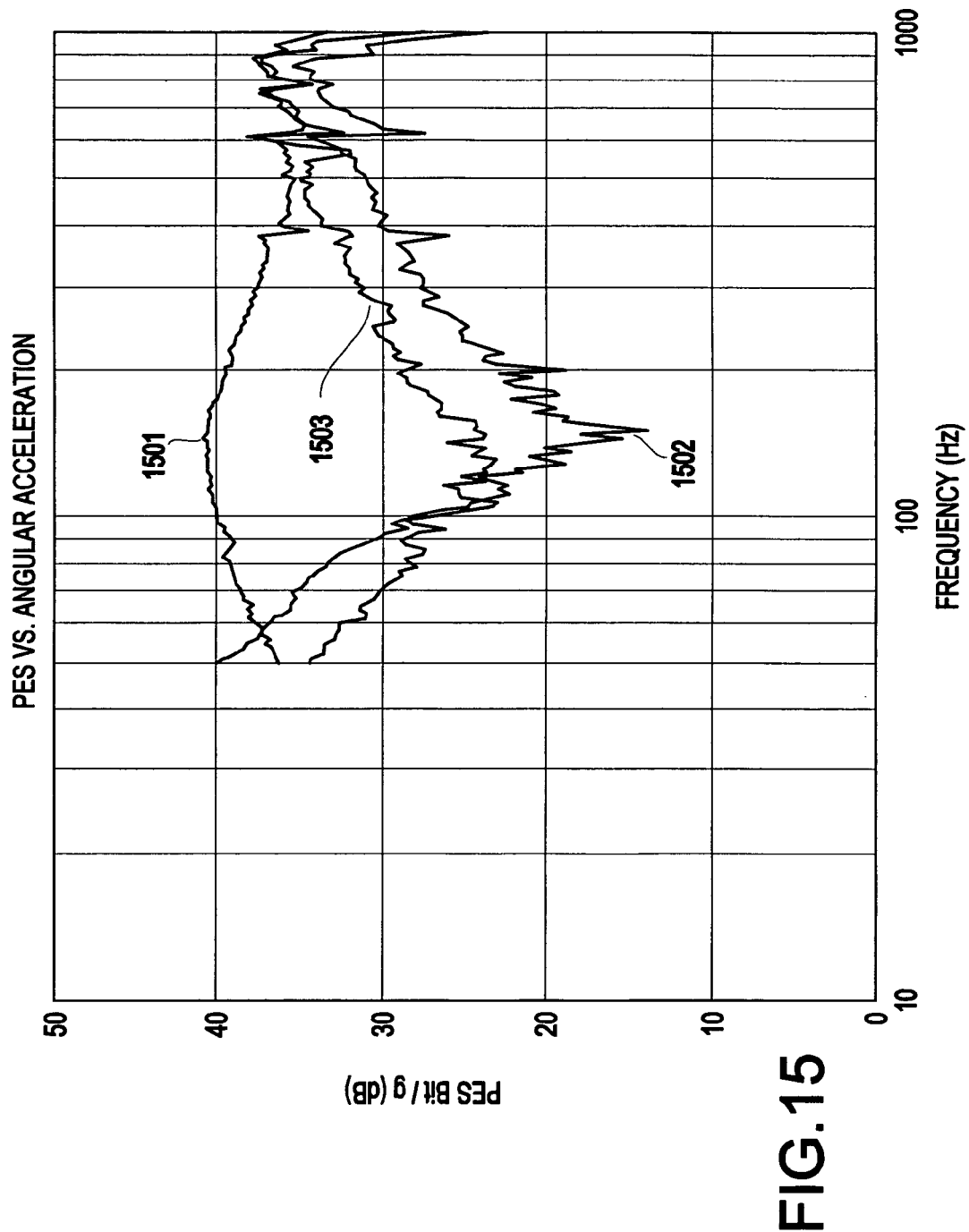
FIG. 15 illustrates an effect of rotational vibration (RV) on position error signal (PES) for three configurations, and specifically a measured transfer function of input-RV acceleration to PES under various control conditions.

FIG. 15 shows the fundamental effect of a sensor-based feed forward solution as compared to a conventional servo. It also compares the effectiveness of two different sensing methods (e.g., the PZT sensor and the back EMF sensor).

It can be seen that there is an optimum frequency at which maximum error rejection is achieved. When the net phase difference between the feed forward signal that is injected into the actuator driver and true angular acceleration is closer to 0 deg. (after accounting for the filtering operations and sensor based phase change), the maximum error rejection is achieved.

Thus, FIG. 15 shows the effect of RV on PES under three conditions. That is, FIG. 15 shows the ratio of the output PES to input RV.

The conventional case 1501 is the waveform with no RV acceleration or velocity sensing for control compensation (e.g., no feedforward). Thus, for one unit input G (e.g., at 100 Hz, 40 dB), one track width error in the position error signal (PES) is equal to 256 bits. Hence, 100 bits will be equal to about one-half the track width. Thus, 40 dB (1G) will equal to 100 bits in the conventional case and the conventional servo loop structure will be unable to remedy the problem.

The next case 1502 establishes the best configuration with a high sensitivity PZT (e.g., high cost, dual PZT sensors) where the PZT signal is LP and HP filtered and fed forward to the actuator. Thus, performance is good as shown by the PZT-acceleration solution, but cost is very high and further the size increases.

An interesting case as shown in waveform 1502 is that of RV velocity-based control. It can be observed that both sensors produce similar vibration rejection characteristics, but the back-EMF sensor (e.g., shown by curve 1503) produces less attenuation (~8–10 dB) than the PZT-based control. Further, the back-EMF sensor is much less expensive and the size is less than the PZT solution and the space available can be exploited within the disk drive's mechanical components.

It was found that the back-EMF sensor design can be optimized to produce performance that is comparable to the best PZT system. In fact, the back-EMF based configuration produces enhanced compensation at lower frequency from 150 Hz and downwards. Fundamentally different sensing and control structure causes the variation in the transfer function (TF). The TFs were obtained using swept sine method.

Figure 16:
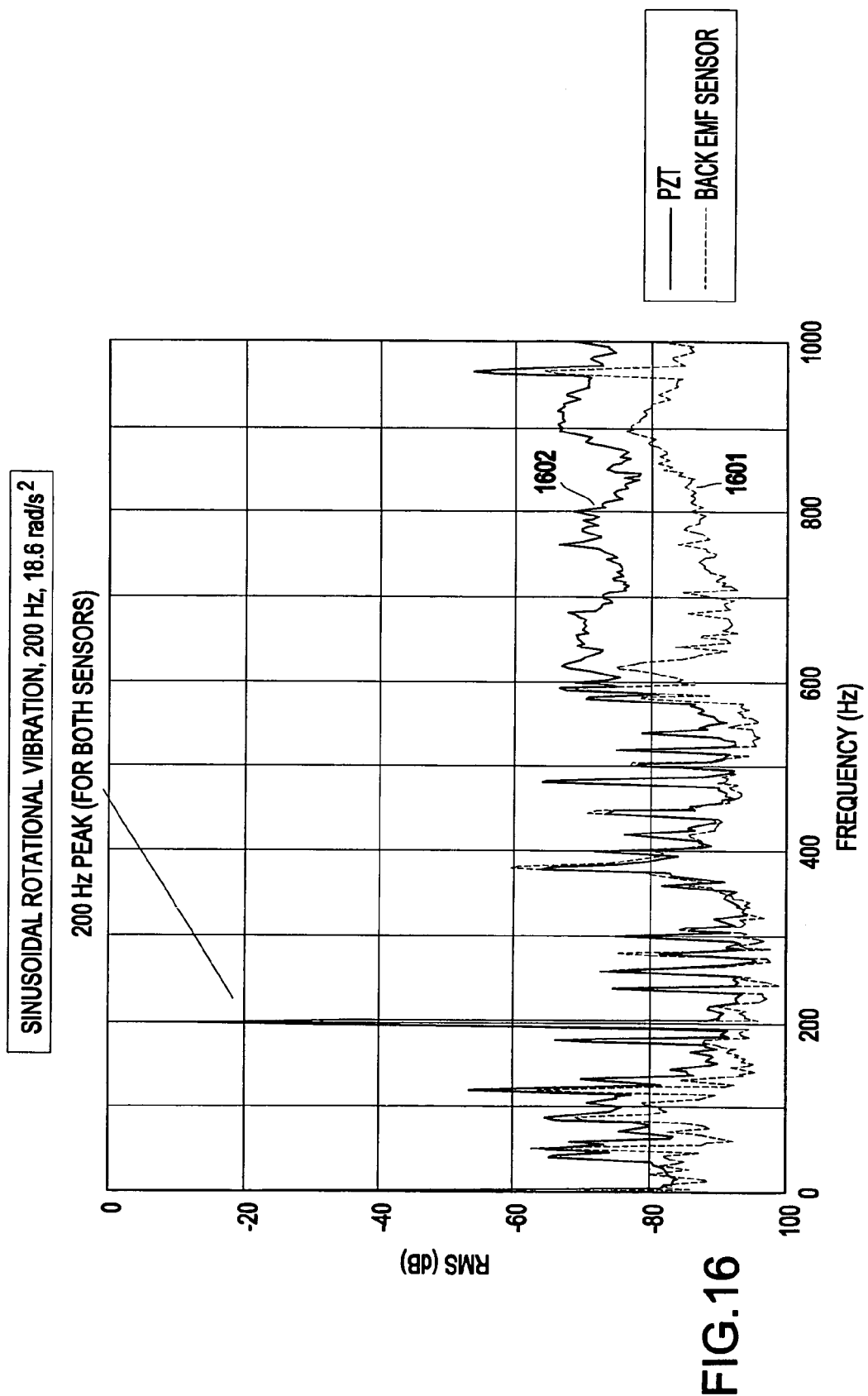
FIG. 16 illustrates a power spectrum of a PZT and a back EMF sensor under 200 Hz sinusoidal excitation.

FIG. 16 compares the power spectrum of a PZT signal 1601 and a back-EMF signal 1602 corresponding to FIG. 13. The back EMF sensor shows additional noise amplitude above 600 Hz in this example, but the net effect of this noise does not contribute measurably to the accuracy of the feed forward configuration.

Figure 17A:
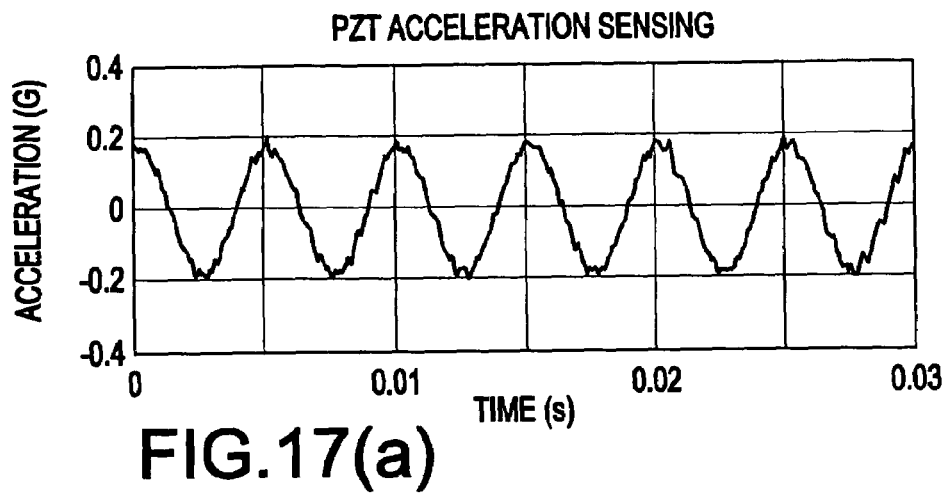
FIGS. 17(a)–17(c) illustrate an output of two different form factor back EMF sensors compared with a PZT sensor.
Figure 17B:
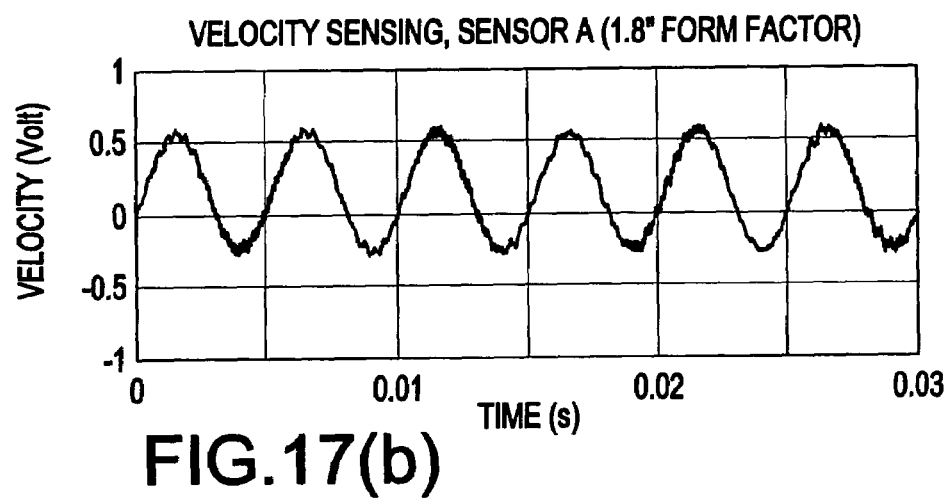
Figure 17C:
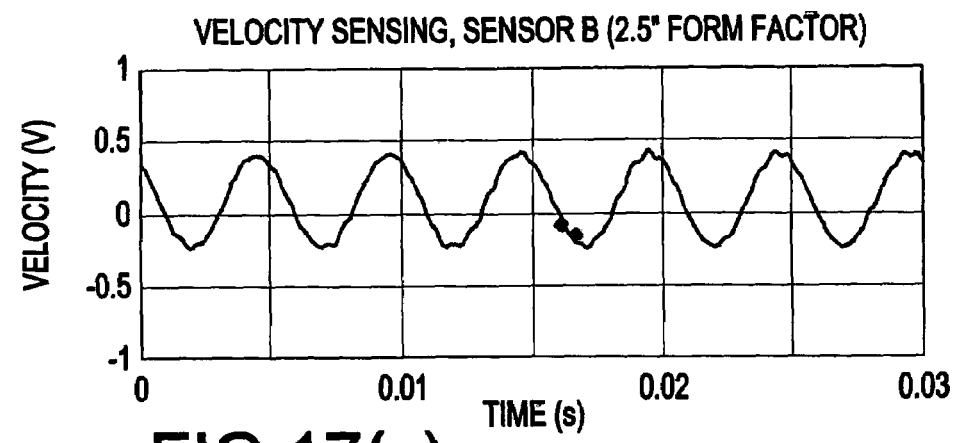

FIGS. 17(a)–17(c) compare the effect of two different form factor back-EMF sensor designs, as well as the PZT acceleration sensing, and shows the time domain signal at a vibration frequency of 200 Hz.

FIG. 17(a) shows the conventional PZT acceleration sensing. FIG. 17(b) illustrates Sensor-A velocity sensing which is based on a 1.8" form factor HDD component and FIG. 17(c) shows a sensor-B velocity sensing which is based on a 2.5" HDD. Both signals were amplified by a gain of 1000. Sensor-B shows slightly improved noise characteristics.

Figure 18A:
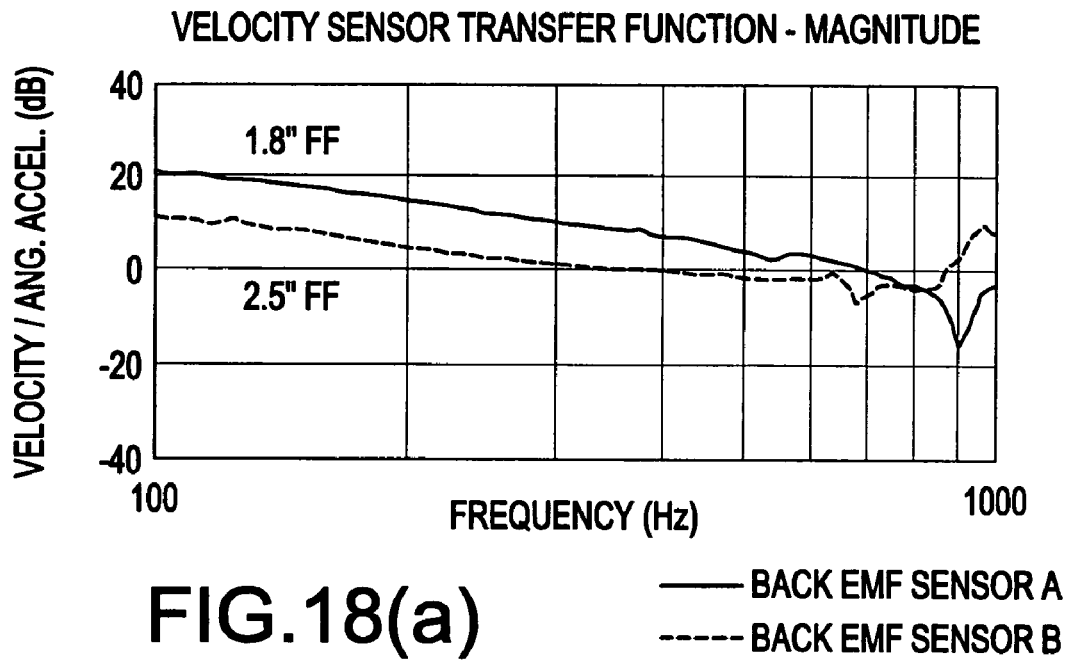
FIGS. 18(a)–18(b) illustrate transfer function characteristics of two form factor back EMF sensors.
Figure 18B:
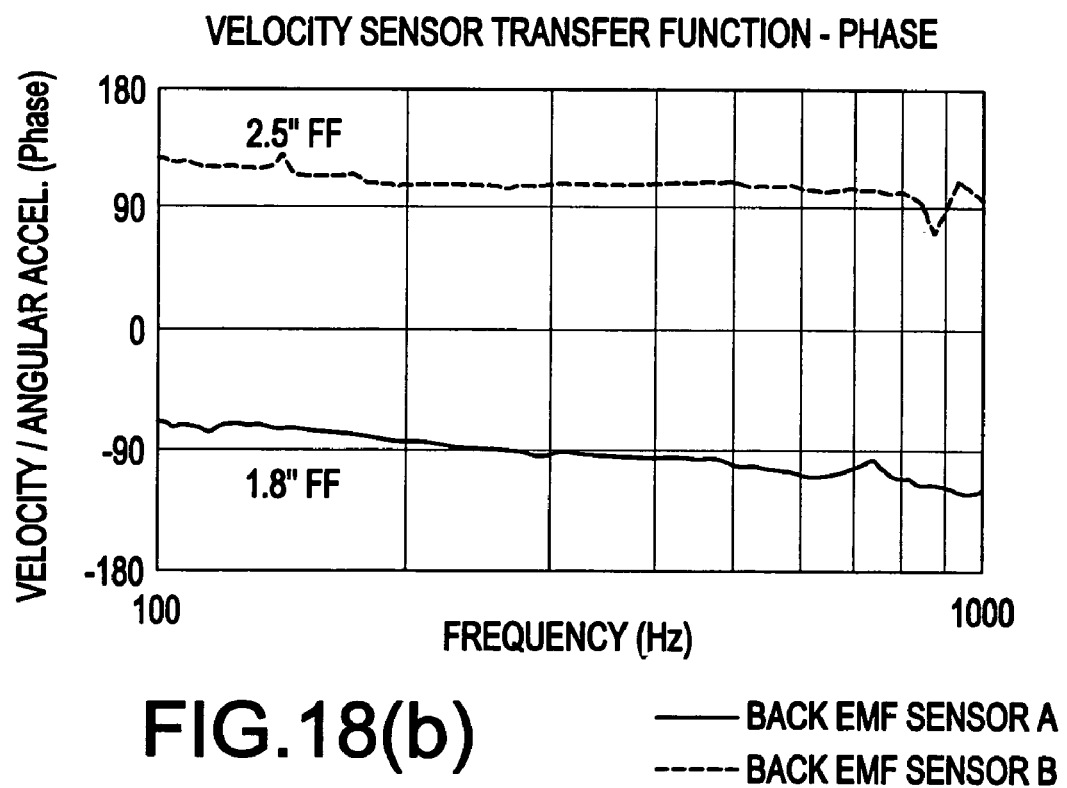

FIGS. 18(a)–18(b) compare the TF of the two sensors A, B (with a sign change to separate the phase by 180 deg.)

Sensor-A has higher sensitivity than sensor-B. The inherent damping present in each pivot affects the phase roll-off as can be seen in FIG. 18(b). As known, looking at the 200 Hz point in FIG. 18(a)–18(b), that data point corresponds to the time domain of FIG. 17(a)–17(c).

Figure 19:
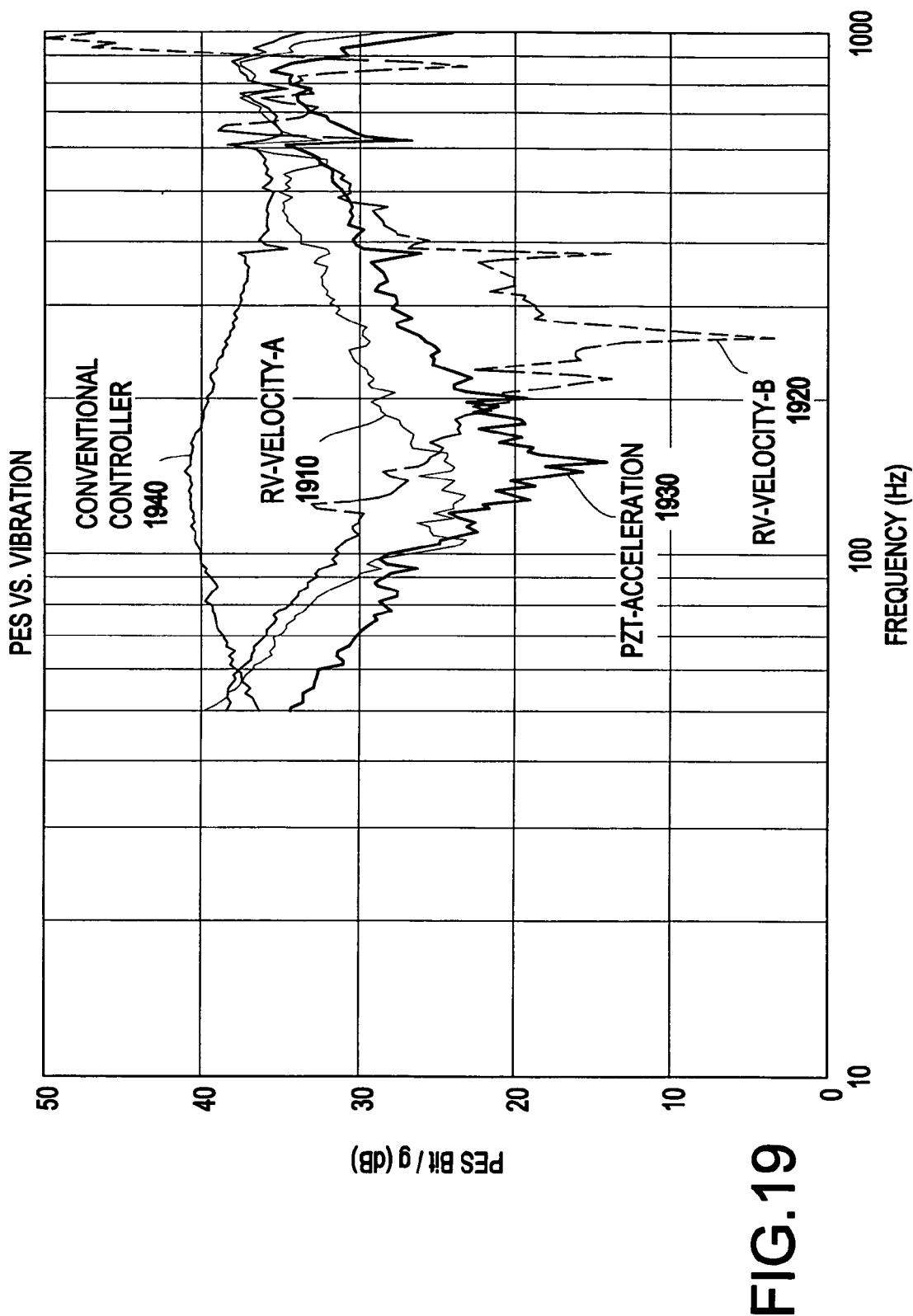
FIG. 19 illustrates an effect of rotational vibration on position error signal for four configurations.

FIG. 19 is an extended version of FIG. 15 where two back EMF based RV sensor performances (e.g., sensor A, sensor B) 1910, 1920 are compared, along with the conventional controller 1930 and PZT acceleration sensor 1940.

It is evident from FIG. 19 that the frequency of maximum rejection occurs at about 250 Hz for sensor-B compared to about 150 Hz for sensor-A when an identical feed forward algorithm is used. By optimizing the sensor damping characteristics and algorithm's phase, the maximum rejection point can be located optimally for a given vibration spectrum.

Thus, in terms of phase characteristics and so on, even with the same algorithm, one sensor may be more advantageous than another sensor in certain frequency ranges. For example, velocity sensing sensor B appears to perform good rejection, and appears to be better than sensor A, as shown in FIG. 19. Again, in the case at hand, looking at around 200 Hz in FIG. 18(b), the phase is rather flat in FIG. 18(b) for the 2.5" FF sensor, as compared to the phase for the 1.8" FF sensor which appears to drop. As known, a flat phase closer to 90 degrees is better (for compensation average) than one that is declining.

It is understood that the net phase of the sensor/algorithm combination must be equal to zero degrees in order to achieve maximum vibration rejection. In practice, however, it is not possible to obtain zero-degree phase through out the desired frequency range (100–1000 Hz) because of inherent phase lag present due to limited feed forward sampling rate. A sub-optimum rejection can still be achieved, as shown by FIGS. 17(a)–17(c), for each sensor technology.

Figure 20A:
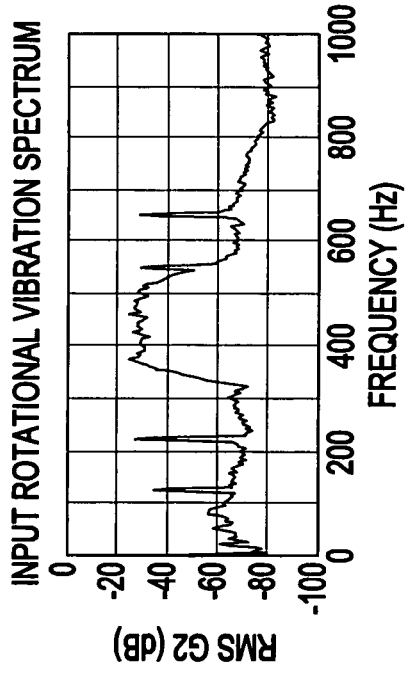
FIGS. 20(a)–20(b) illustrate an effect of rotational random vibration on position error signal.
Figure 20B:
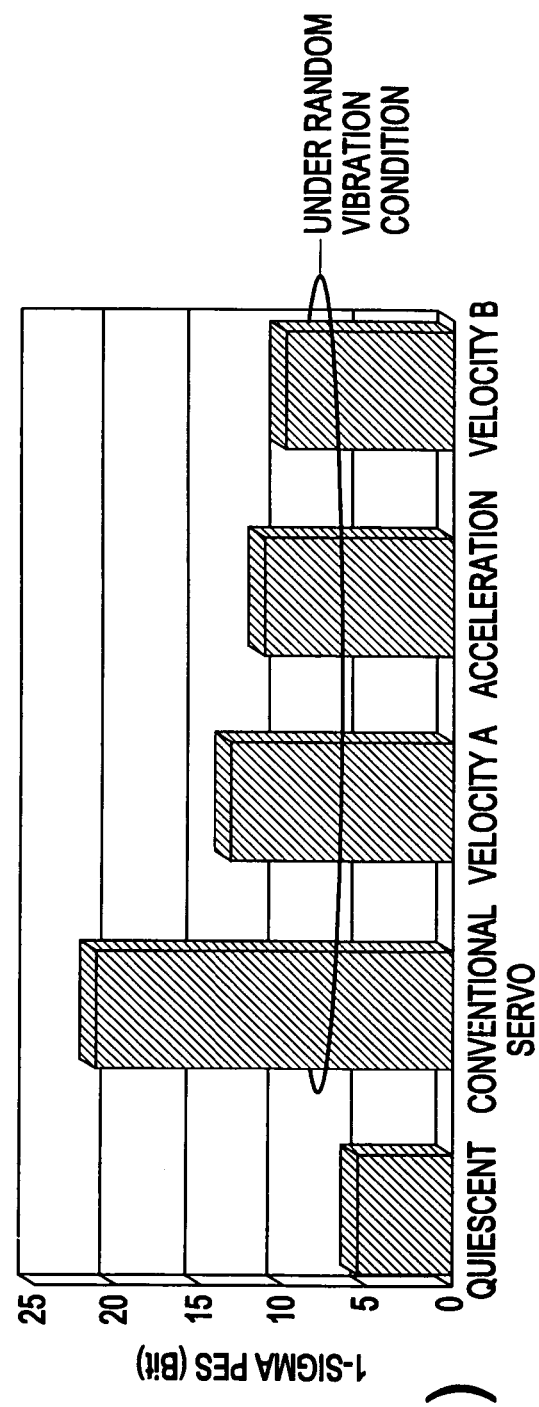

FIG. 20(a) shows a typical RV spectrum seen in a server product. FIG. 20(b) shows the effect of this RV on each servo compensation scheme. The spectral characteristics are generated using a specially programmable waveform generator and it mimics a typical RV characteristics observed in a server system. As shown in FIG. 2(a), the vibration spectrum has a hump at about 300 to about 600 Hz, generated by exciting a table in the laboratory.

FIG. 20(b) shows performance due to random rotational vibration, and more specifically shows the corresponding PES (1-sigma) value for an input RV value of 22.8 r/s$^2$. It is shown that, under conventional control, the PES value quadruples to 21 or 22-bits (1-sigma).

With RV velocity-sensor based control, it drops to 12 or 13-bit (13 dB) and, with near ideal PZT (e.g., with high-quality, high-cost dual PZT sensor arrangement), it improves further to 11-bit (11 dB). With no vibration, there will be 6 bits observed (e.g., under quiescent conditions with a conventional servo arrangement).

Thus, it is evident from FIG. 20(b) that the conventional servo degrades by a factor of 4 compared to the no-RV (quiescent) case.

Thus, these Figures correspond to applying an expected random vibration seen in server computers in which there are multiple drives functions. Using velocity-based feed forward compensation, the error can be reduced by about 50%. The benefit of PZT based sensing is not evident from this data set.

Figure 21A:
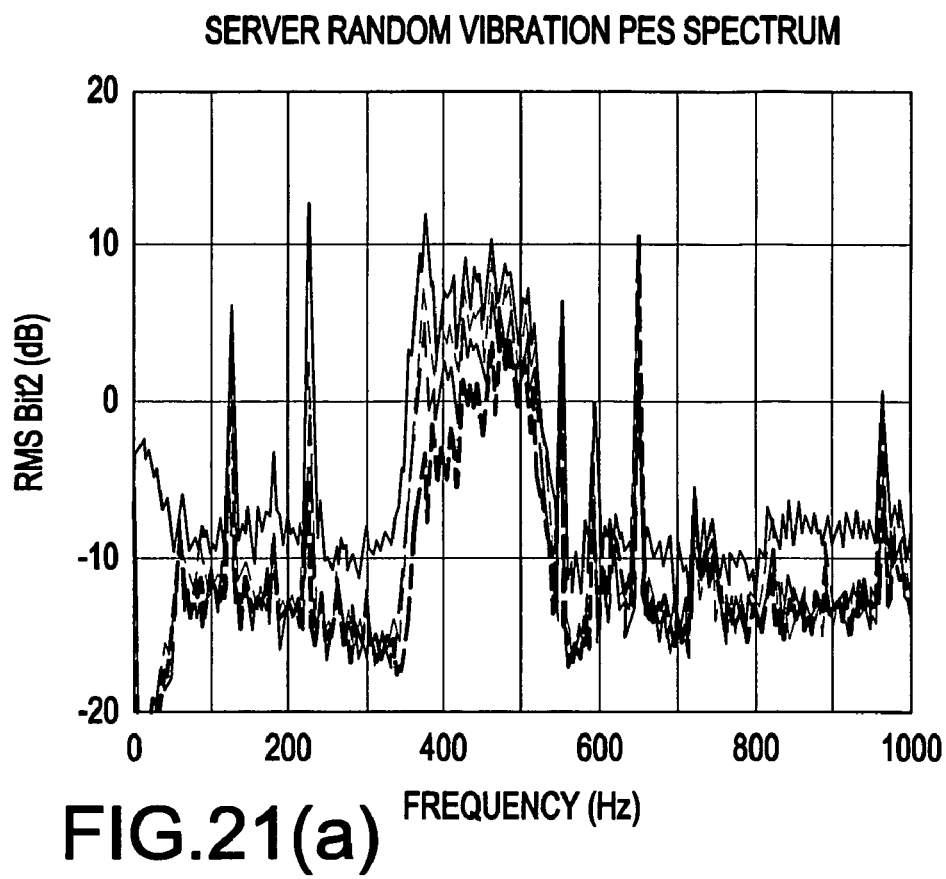
FIGS. 21(a)–21(b) illustrate a power spectrum of a position error signal under rotational random vibration.
Figure 21B:
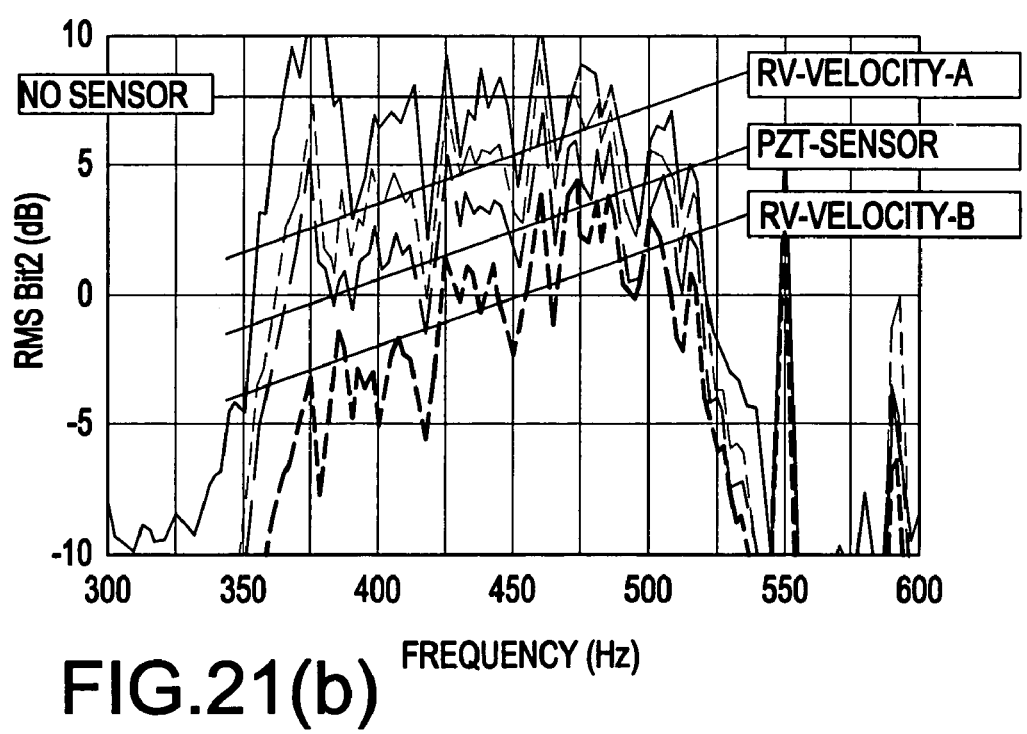

However, FIGS. 21(a) and 21(b) show the power spectrum of the PES for random RV input of FIG. 20(a). Reduction in spectral magnitude in the range from 100 to 400 Hz is achieved by the feed forward solution.

While the back-EMF sensor is employed to enhance RV robustness, the same sensor output can be used to detect operating shock due to "hot swap" activity by a user. The sensor signal resulting from a shock event can be used to inhibit write process to protect data being erased in the neighboring tracks. On the other hand, when the RV vibration level is below a preselected threshold, the sensor feed forward can be disabled to minimize noise induced TMR.

Figure 22:
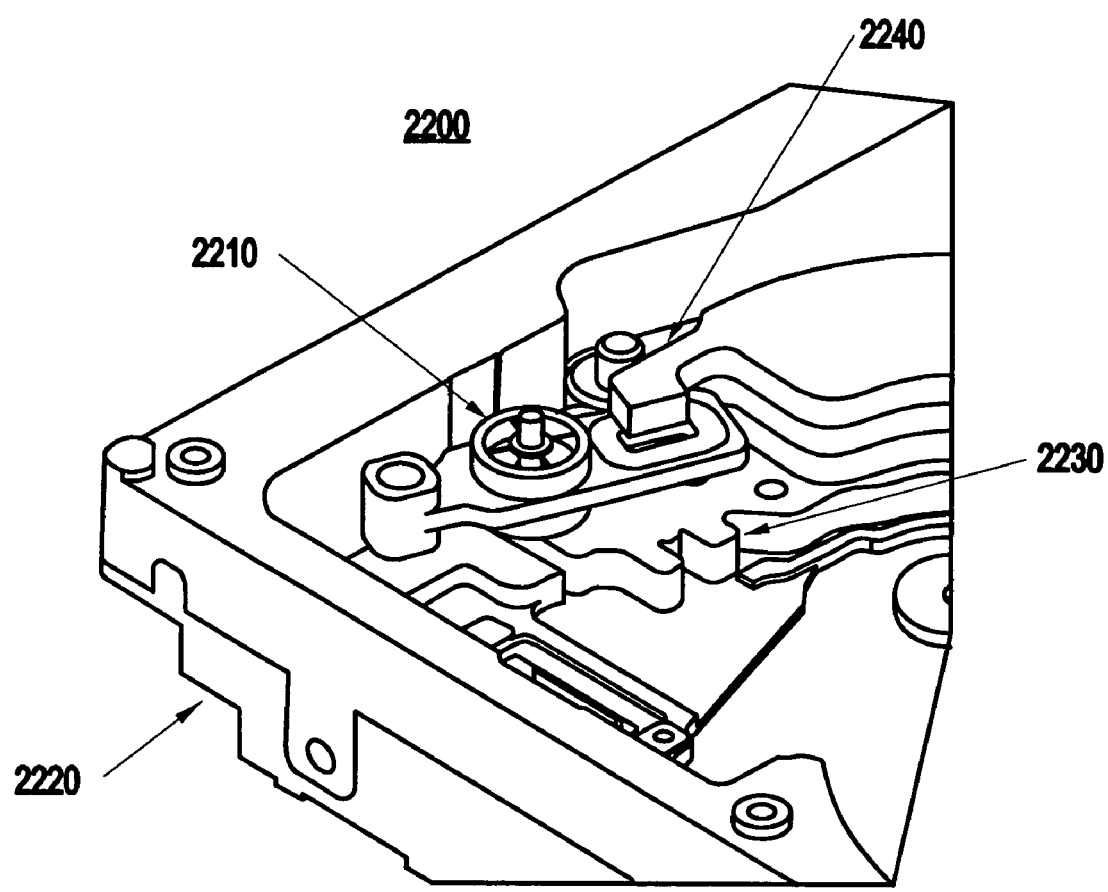
FIG. 22 illustrates an isometric view of a structure 2200 in which a back EMF sensor is housed inside the disk drive.

FIG. 22 illustrates a realistic device and more specifically an isometric view of a structure 2200 including a back EMF sensor 2210 housed inside a disk drive housing 2220.

In FIG. 22, the integrated back EMF sensor 2210 is coupled to the magnetic yokes (e.g., bottom yoke 2230 being shown but for clarity, the top yoke has been removed) of the VCM and shares the magnetic flux by an extension to the VCM magnets 2240. As shown in FIG. 22, the sensor 2210 mounted within a drive housing 2220 and without interference with present drive elements. An electrical connection (not shown) from a wound electrical sensing coil is made with a discrete pair of wires or by integrating the main actuator VCM flexible cable to carry signals to the main electrical card.

Figure 23:
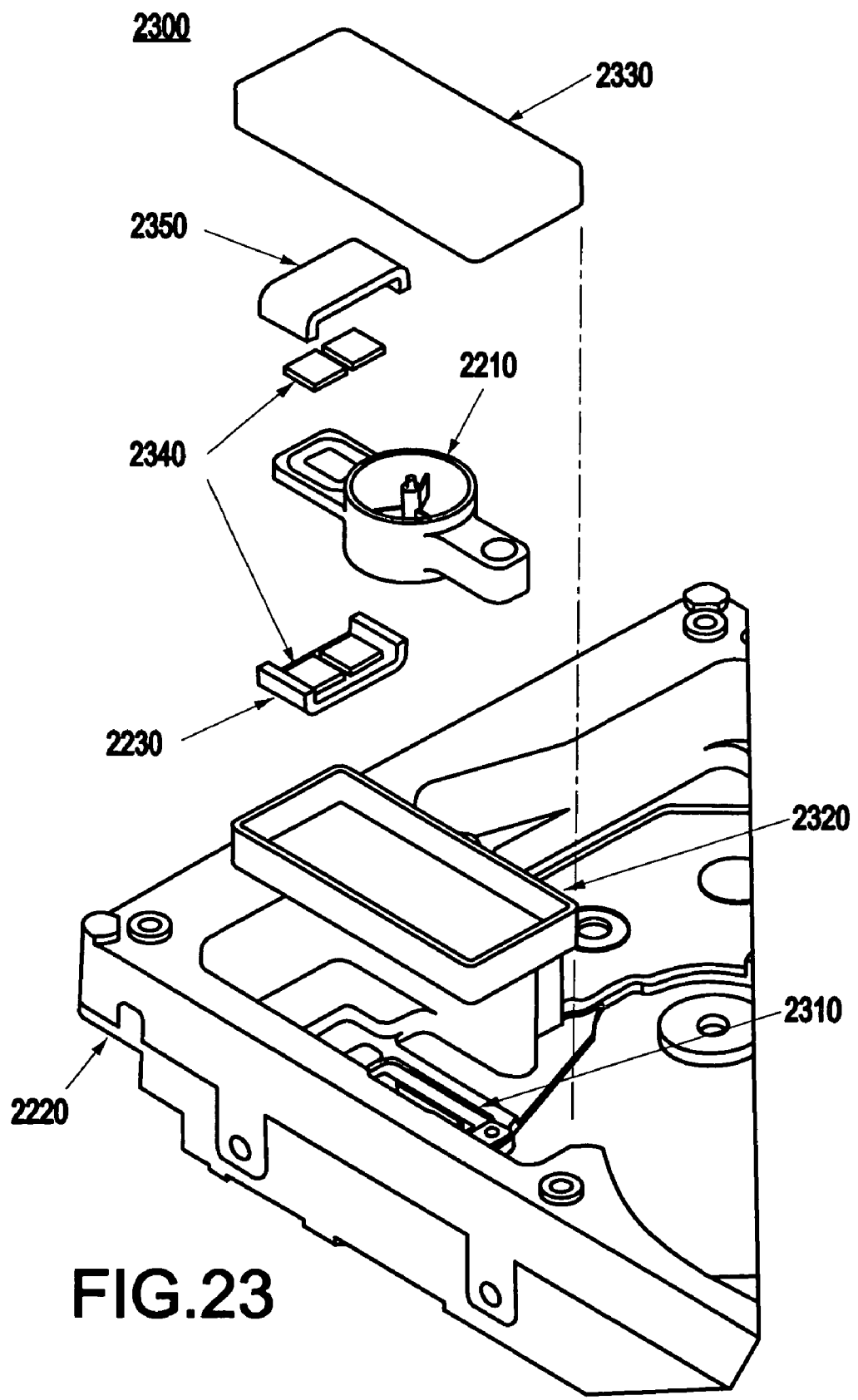
FIG. 23 illustrates an exploded view of a discrete back EMF sensor 2300.

FIG. 23 illustrates an exploded view of the discrete back EMF sensor 2210. FIG. 23 presents the sensor 2210 mounted within the disk drive housing 2220 and without interference with present drive elements. Electrical connection is made by pressure contact between an interface card (not shown) mounted to the sensor assembly 2210 and the existing interface electronics cable 2310. To complete the structure of the sensor, further shown are the top and bottom covers 2320, 2330, the magnets 2340, and the top and bottom yokes 2350, 2230. The top and bottom covers encapsulate the sensor 2210. An important feature of this structure is that, when the sensor is dropped into the disk drive, it automatically makes connection with the electronic interface connector 2310, thereby avoiding additional wiring and its attendant problems. Thus, the sensor provides a low-cost, drop-in, modular solution.

Figure 24:
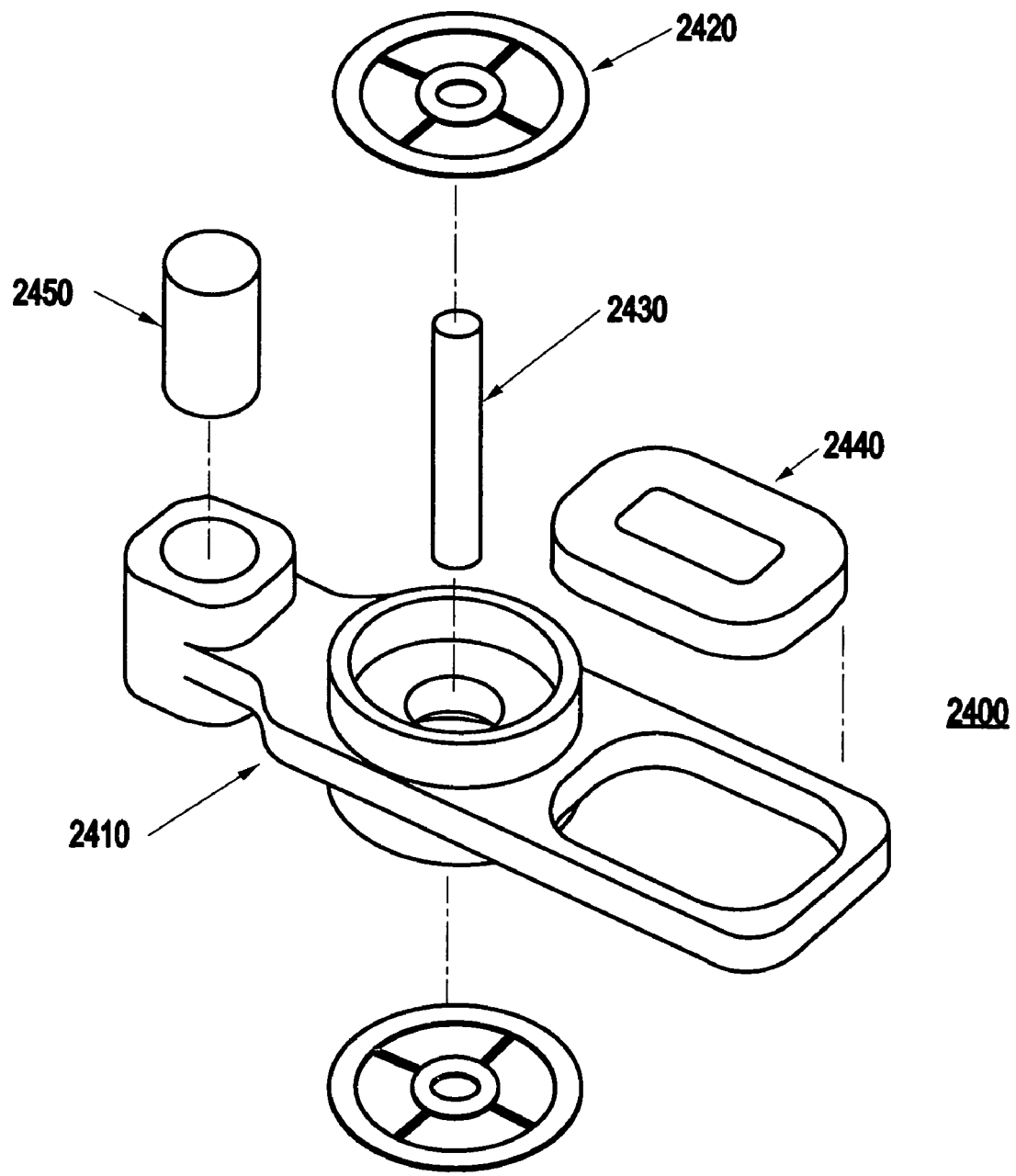
FIG. 24 illustrates a low cost sensor body assembly 2400 comprising either a cast metal or plastic molded body.

FIG. 24 illustrates a low-cost sensor body assembly 2400 comprising either a cast metal or plastic molded body 2410. Plastic molded, etched or stamped metal flexures 2420 can be assembled by a metallic pivot element 2430. Preferably, the top and bottom flexures are two-piece thin members with thin links, and are similar to what is shown in FIGS. 5(a)–5(d). A sensing coil 2440 is placed in position and the assembly is mass balanced about the pivot axis of rotation by a predetermined balancing mass 2450.

Figure 25:
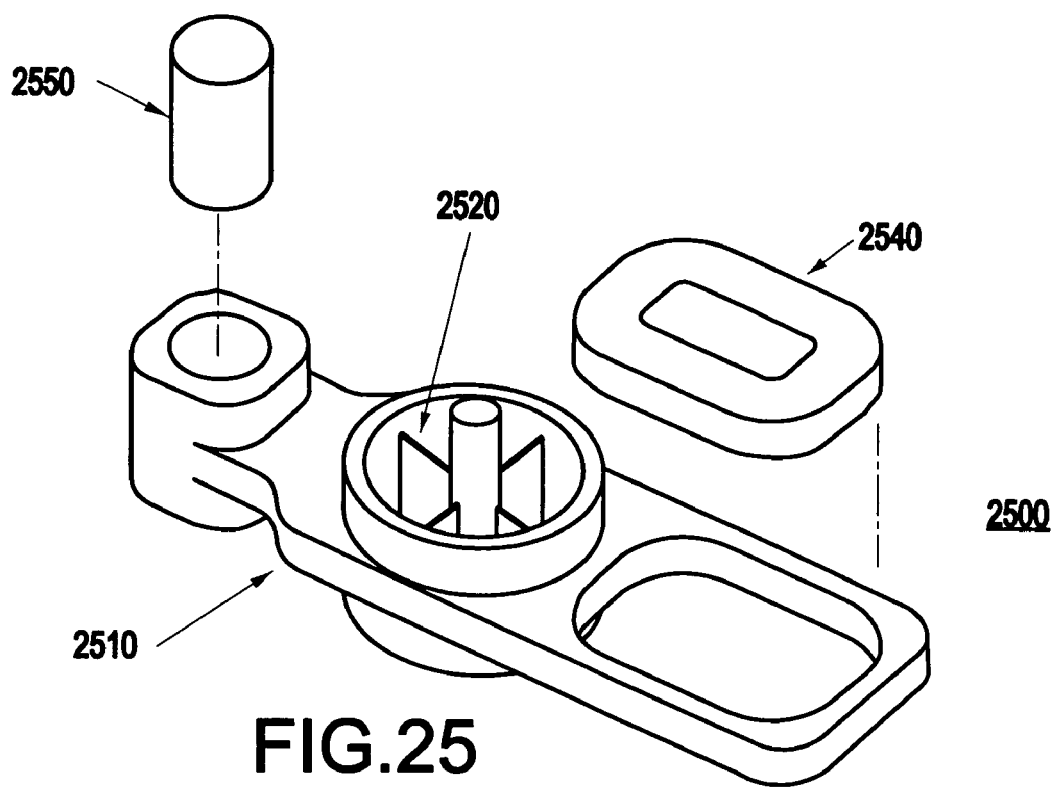
FIG. 25 illustrates a low cost sensor body assembly 2500 wherein metallic flexural elements are integrally cast or molded into the sensor body.

FIG. 25 illustrates a low cost sensor body assembly 2500 wherein (unlike the two-piece structure of FIG. 24) metallic flexural elements 2520 are integrally cast or molded into a sensor body 2510, and have a blade-like shape having a substantial height to them. A sensing coil 2540 is placed in position and the assembly is massed balanced centrally about the pivot axis of rotation by a predetermined balancing mass 2550.

Figure 26:
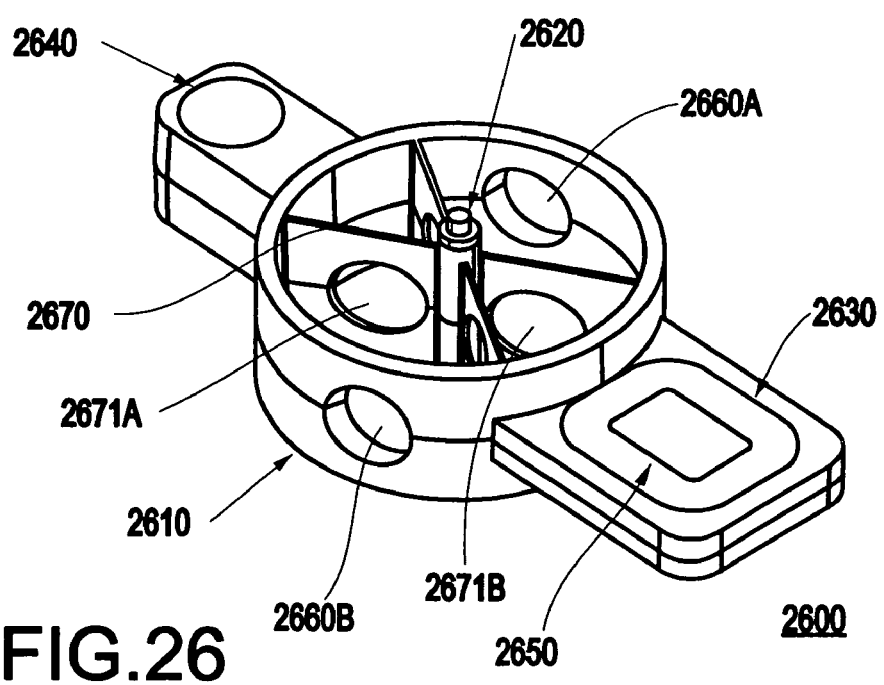
FIG. 26 illustrates a low cost embodiment of a sensor body assembly 2600 wherein the flexural elements are integral to an injection molded plastic part.

FIG. 26 illustrates a preferred low-cost embodiment of a sensor body assembly 2600 wherein the flexural elements are integral to an injection molded plastic part. A sensor body 2610 is provided in which a metal pivot 2620, wound electrical sensing coil 2630, and predetermined balancing mass 2640 are insert molded together as part of the injection molded part. An inertial mass 2650 is added (if necessary) to optimize inertial properties and balancing mass 2640 sized to mass balance the assembly as previously described.

The sensor body 2610 provides a plurality of holes 2660A, 2660B for machine tools access to pivoting flexures 2670 so that the pivot's stiffness can be minimized to achieve low rotational resonance. Further, the metal flexures 2670 also have holes 2671A, 2671B formed therein Thus, the assembly 2600 of FIG. 26 is advantageous and shows a practical method of achieving low stiffness in planar rotation by having the plurality of holes drilled after the molding process.

Figure 27A:
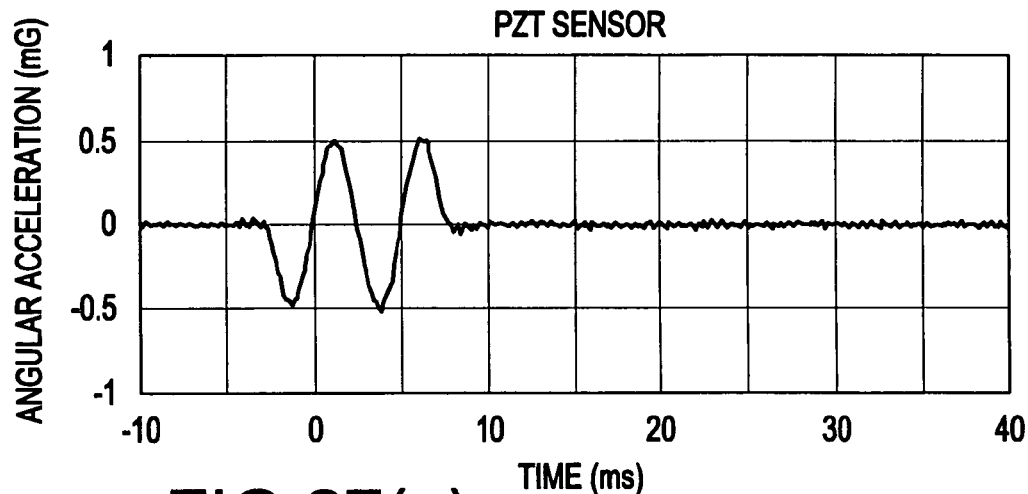
FIGS. 27(a) and 27(b) illustrate the effect of a transient vibration pattern on the response of a conventional PZT sensor (FIG. 27(a)) and on a velocity sensor according to the present invention (FIG. 27(b)).
Figure 27B:
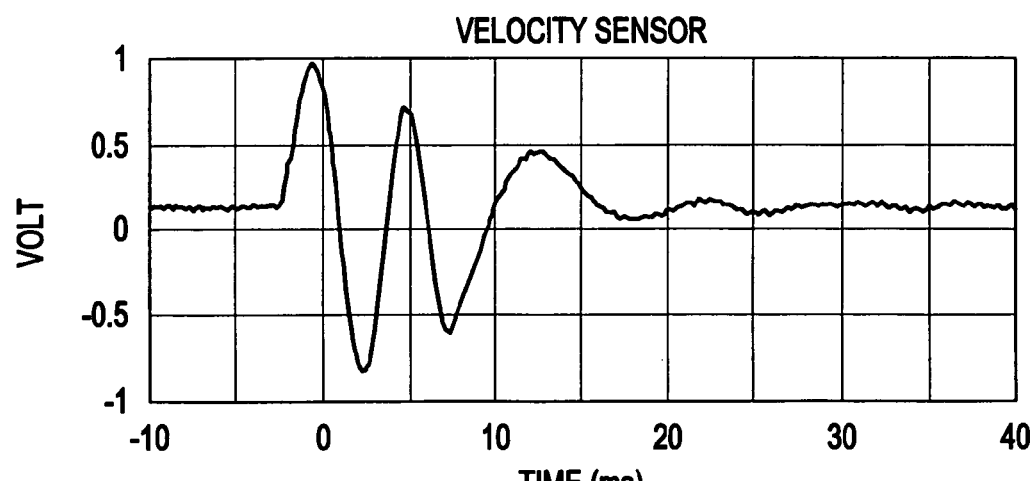

FIGS. 27(*a*) and 27(*b*) illustrate the effect of a transient vibration pattern on the response of a conventional PZT sensor (FIG. 27(*a*)) and on a velocity sensor for use with the invention (FIG. 27(*b*)). The sensors are under a transient condition with an input sinusoidal angular pulses at 200 HZ and 49 rad/s$^2$.

While the invention has been described in terms of several preferred embodiments, those skilled in the art will recognize that the invention can be practiced with modification within the spirit and scope of the appended claims.

What is claimed is:

1. A disk drive, comprising: a sensor for directly sensing a rotational vibration velocity component of the disk drive, said sensor including a coil and a plurality of pivot flexures for providing an electrical link to the coil, wherein said sensor provides an output for feedforward compensation, said output for feedforward compensation being disabled during a track-follow mode of said disk drive if a threshold level rotation velocity is not reached.

2. The disk drive of claim 1, wherein said sensor comprises a back electromotive force (EMF) sensor to detect said rotation vibration velocity component.

3. The disk drive of claim 1, wherein said disk drive further includes a main voice coil motor (VCM), and wherein said sensor is constructed to share a magnetic flux of said main VCM.

4. The disk drive of claim 1, further comprising an arm of an inertial latch, said inertial latch including first and second modes of activation, wherein said sensor is mounted adjacent said arm.

5. The disk drive of claim 1, wherein said sensor comprises a back electromotive force (EMF) sensor and said coil comprises a back EMF coil.

6. The disk drive of claim 1, wherein a sensor transfer function is optimized to meet a performance range of 100–1000 Hz rotational vibration.

7. The disk drive of claim 1, wherein said output of said sensor for feedforward compensation is disabled during a seek of said disk drive, and is activated after a settle-out phase of said disk drive.

8. The disk drive of claim 1, wherein a damping of said sensor is used for optimizing a feed forward compensation.

9. The disk drive of claim 1, wherein said sensor provides a write inhibit function during a "hot-swap" shock event.

10. A sensor for a disk drive, comprising: a back electromotive force (EMF) sensor for directly sensing a rotational vibration velocity of said disk drive, wherein said back EMF sensor includes a flexured system comprising a flexured pivot having a multi-turn cross-sectional coil, a sensor beam, and a mass for center of gravity balancing, wherein the flexured pivot comprises one of a sheet metal assembly with visco-elastic damping, and plastic having an intrinsic damping property.

11. A sensor for a disk drive, comprising: a back electromotive force (EMF) sensor for directly sensing a rotational vibration velocity of said disk drive, wherein said back EMF sensor includes a coil sharing an air gap of a main voice coil motor (VCM) actuator, said VCM including magnets, the back EMF sensor being formed behind the magnets of the main VCM, and wherein said magnets include a voice coil magnet which is extended, said coil of said sensor being supported by said extended voice coil magnet.

12. A disk drive, comprising: a back electromotive force (EMF) sensor for directly sensing a rotational vibration velocity component of the disk drive, and a latch system for protecting said drive in a shock environment, said latch system including a latch having a spring coupled thereto, said latch further coupling to a lever via a contact point, wherein said latch latches a main actuator coil of said drive, and is activated by acceleration, wherein a coil of said back EMF sensor is supported by said lever.

13. The disk drive of claim 12, further comprising: a second spring for maintaining a neutral position of the lever for no contact thereof, said drive having an actuator magnet with an extension for the sensor air gap flux, and said lever having mounted thereon a low friction pivot.

14. A disk drive, comprising: a sensor for directly sensing a rotational vibration velocity component of the disk drive, wherein said sensor comprises a body assembly comprising one of a cast metal and a molded plastic, and flexures comprising one of plastic molded, etched and stamped metal flexures assembled onto a metallic pivot element.

15. The disk drive of claim 14, wherein said flexures comprise two-piece members with links.

16. A disk drive, comprising: a sensor for directly sensing a rotational vibration velocity component of the disk drive, wherein said sensor includes flexural elements integrally formed with an injection molded plastic part to form a sensor body, wherein said sensor body includes a plurality of holes formed therein and said flexure elements have a plurality of holes formed therein so as to minimize stiffness to achieve a predetermined low rotational resonance.

* * * * *